(12) United States Patent
Rudd et al.

(10) Patent No.: US 11,662,267 B2
(45) Date of Patent: May 30, 2023

(54) SMART WATER VALVE

(71) Applicant: Alarm.com Incorporated, Tysons, VA (US)

(72) Inventors: Grant Rudd, Braintree, MA (US); Harrison Wayne Donahue, Attleboro, MA (US); Craig Carl Heffernan, Oregon City, OR (US); Daniel Marc Goodman, Needham, MA (US); Liam Shea Daly, Needham, MA (US)

(73) Assignee: Alarm.com Incorporated, Tysons, VA (US)

( * ) Notice: Subject to any disclaimer, the term of this patent is extended or adjusted under 35 U.S.C. 154(b) by 272 days.

(21) Appl. No.: 16/899,108

(22) Filed: Jun. 11, 2020

(65) Prior Publication Data

US 2020/0393324 A1 Dec. 17, 2020

Related U.S. Application Data

(60) Provisional application No. 62/861,664, filed on Jun. 14, 2019.

(51) Int. Cl.
*E03B 7/07* (2006.01)
*F16K 31/02* (2006.01)
(Continued)

(52) U.S. Cl.
CPC .......... *G01M 3/2807* (2013.01); *E03B 7/071* (2013.01); *F16K 31/02* (2013.01);
(Continued)

(58) Field of Classification Search
CPC ................ F16K 37/0041; E03B 7/071; G01D 2204/22; G01M 3/2807; G08B 21/20
See application file for complete search history.

(56) References Cited

U.S. PATENT DOCUMENTS 4,106,670 A * 8/1978 Takeda ............... B01D 53/1456
137/624.11
4,951,915 A * 8/1990 Piao .................. F16K 31/52408
74/89.17

(Continued)

FOREIGN PATENT DOCUMENTS

| FR | 2 694 087 | 1/1994 |
| FR | 3 043 461 | 5/2017 |
| WO | WO2017153997 | 9/2017 |

OTHER PUBLICATIONS

PCT International Search Report and Written Opinion in International Application No. PCT/US2020/037285, dated Sep. 16, 2020, 14 pages.

(Continued)

*Primary Examiner* — Matthew W Jellett
(74) *Attorney, Agent, or Firm* — Fish & Richardson P.C.

(57) ABSTRACT

Methods, systems, and apparatus, including computer programs encoded on a storage device, for water monitoring are disclosed. A system includes one or more processors and one or more computer storage media storing instructions that are operable, when executed by the one or more processors, to cause the one or more processors to perform operations. The operations include determining with a leak sensor that a water leak is occurring at a property; after determining that the water leak is occurring at the property, determining that a water usage profile of a particular water consuming device matches characteristics of the water leak; based on determining that the water usage profile of a particular water consuming device matches characteristics of the water leak, identifying a water consuming device that is likely leaking; and in response to identifying the water consuming device that is likely leaking, performing a system action.

20 Claims, 5 Drawing Sheets

(51) Int. Cl.
*F16K 37/00* (2006.01)
*G01M 3/28* (2006.01)
*G08B 21/20* (2006.01)
*G06F 16/9035* (2019.01)

(52) U.S. Cl.
CPC ...... *F16K 37/0041* (2013.01); *G06F 16/9035* (2019.01); *G08B 21/20* (2013.01)

(56) References Cited

U.S. PATENT DOCUMENTS

| | | | | |
|---|---|---|---|---|
| 5,000,224 | A * | 3/1991 | Olson, Jr. | F17D 5/00 137/487.5 |
| 5,568,825 | A * | 10/1996 | Faulk | G01M 3/2807 137/552 |
| 8,170,695 | B2 | 5/2012 | Spicer et al. | |
| 8,457,908 | B2 * | 6/2013 | Patel | F17D 1/08 702/50 |
| 9,261,863 | B2 | 2/2016 | Sloop et al. | |
| 9,483,737 | B2 | 11/2016 | Sanchez Loureda | |
| 10,642,289 | B1 * | 5/2020 | Reeder | G05D 23/1366 |
| 2001/0003286 | A1 * | 6/2001 | Philippbar | G01M 3/243 137/487.5 |
| 2003/0178596 | A1 * | 9/2003 | Gomi | F16K 27/0218 251/305 |
| 2005/0062000 | A1 | 3/2005 | Bartell, Jr. et al. | |
| 2006/0059977 | A1 | 3/2006 | Kates | |
| 2008/0251131 | A1 | 10/2008 | Ford | |
| 2010/0313958 | A1 | 12/2010 | Patel et al. | |
| 2011/0022242 | A1 | 1/2011 | Bukhin et al. | |
| 2012/0022803 | A1 | 1/2012 | Donnelly et al. | |
| 2012/0139749 | A1 | 6/2012 | Belz et al. | |
| 2013/0289788 | A1 | 10/2013 | Gupta et al. | |
| 2016/0201933 | A1 | 7/2016 | Hester et al. | |
| 2016/0349140 | A1 | 12/2016 | Teymouri | |
| 2017/0030798 | A1 | 2/2017 | DeVerse | |
| 2018/0045599 | A1 | 2/2018 | Larach | |
| 2018/0143056 | A1 | 5/2018 | Gal | |
| 2018/0144418 | A1 | 5/2018 | Ravid et al. | |
| 2018/0230681 | A1 | 8/2018 | Poojary et al. | |
| 2019/0025150 | A1 | 1/2019 | Picardi et al. | |

OTHER PUBLICATIONS

Extended European Search Report in European Appln. No. 20823101.9, dated Jun. 27, 2022, 9 pages.

* cited by examiner

400

```
┌─────────────────────────────────────────────────────────────────────┐
│ DETERMINE WITH A LEAK SENSOR THAT A WATER LEAK IS OCCURRING AT A PROPERTY │
│                                                                 402 │
└─────────────────────────────────────────────────────────────────────┘
                                    ↓
┌─────────────────────────────────────────────────────────────────────┐
│ AFTER DETERMINING THAT THE WATER LEAK IS OCCURRING AT THE PROPERTY, │
│ DETERMINING THAT A WATER USAGE PROFILE OF A PARTICULAR WATER CONSUMING │
│ DEVICE MATCHES CHARACTERISTICS OF THE WATER LEAK                    │
│                                                                 404 │
└─────────────────────────────────────────────────────────────────────┘
                                    ↓
┌─────────────────────────────────────────────────────────────────────┐
│ BASED ON DETERMINING THAT THE WATER USAGE PROFILE OF A PARTICULAR WATER │
│ CONSUMING DEVICE MATCHES CHARACTERISTICS OF THE WATER LEAK, IDENTIFYING │
│ A WATER CONSUMING DEVICE THAT IS LIKELY LEAKING                     │
│                                                                 406 │
└─────────────────────────────────────────────────────────────────────┘
                                    ↓
┌─────────────────────────────────────────────────────────────────────┐
│ IN RESPONSE TO IDENTIFYING THE WATER CONSUMING DEVICE THAT IS LIKELY │
│ LEAKING, PERFORMING A SYSTEM ACTION                                 │
│                                                                 408 │
└─────────────────────────────────────────────────────────────────────┘
```

FIG. 4

SMART WATER VALVE

CROSS-REFERENCE TO RELATED APPLICATION

This application claims the benefit of U.S. Application No. 62/861,664, filed Jun. 14, 2019, which is incorporated by reference in its entirety.

TECHNICAL FIELD

This specification relates generally to water monitoring technology.

BACKGROUND

Water monitoring is a process that that includes monitoring a temperature of water, a flow of water, a quality of water, and so on. Typically, water is monitored using water devices in residential and commercial properties to ensure water flowing into these properties meets user-desired specifications.

SUMMARY

According to an innovative aspect of the subject matter described in this application, a system includes one or more processors and one or more computer storage media storing instructions that are operable, when executed by the one or more processors, to cause the one or more processors to perform operations. The operations include: determining with a leak sensor that a water leak is occurring at a property; after determining that the water leak is occurring at the property, determining that a water usage profile of a particular water consuming device matches characteristics of the water leak; based on determining that the water usage profile of a particular water consuming device matches characteristics of the water leak, identifying a water consuming device that is likely leaking; and in response to identifying the water consuming device that is likely leaking, performing a system action.

Other embodiments of this and other aspects include corresponding systems, apparatus, and computer programs, configured to perform actions of methods encoded on computer storage devices. A system of one or more computers or other processing devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. In some implementations, determining that the water leak is occurring at the property includes determining that a water flow rate through a pipe is greater than zero liters per hour.

In some implementations, the leak sensor is positioned in a low flow bypass connecting to a pipe at each of an upstream connection and a downstream connection. The system may include a first check valve positioned in the pipe at a location between the upstream connection and the downstream connection; and a second check valve positioned in the pipe at a location downstream from the downstream connection.

In some implementations, the characteristics of the water leak include a hot water flow rate of the water leak and a cold water flow rate of the water leak. The water usage profile of the particular water consuming device may include a hot water flow rate and a cold water flow rate. Determining that the water usage profile of the particular water consuming device matches characteristics of the water leak may include determining that the hot water flow rate of the water leak matches the hot water flow rate of the particular water consuming device, and determining that the cold water flow rate of the water leak matches the cold water flow rate of the particular water consuming device.

In some implementations, the characteristics of the water leak include a temperature of the water leak. The water usage profile of the particular water consuming device may include a temperature of water consumed by the particular water consuming device. Determining that the water usage profile of the particular water consuming device matches characteristics of the water leak may include determining that the temperature of the water leak matches the temperature of water consumed by the particular water consuming device.

In some implementations, the water usage profile of the water consuming device includes a flow rate of the water consuming device when leaking. Determining that the water usage profile of the particular water consuming device matches characteristics of the water leak may include determining that the flow rate of the water leak matches the flow rate of the water consuming device when leaking.

In some implementations, determining that a water usage profile of a particular water consuming device matches characteristics of the water leak includes: determining a similarity between the characteristics of the water leak and each of a plurality of water usage profiles of water consuming devices at the property; identifying a particular water usage profile having a greater similarity to the characteristics of the water leak than any other water usage profile; and based on identifying the particular water usage profile having the greater similarity to the characteristics of the water leak than any other water usage profile, determining that the water usage profile of the particular water consuming device matches characteristics of the water leak.

In some implementations, determining that a water usage profile of a particular water consuming device matches characteristics of the water leak includes determining whether a database of water usage profiles includes one or more water usage profiles that match the characteristics of the water leak within a predetermined similarity threshold.

In some implementations, determining with a leak sensor that a water leak is occurring at the property includes: determining an expected rate of water consumption at the property; determining a current rate of water consumption at the property; and determining that the current rate of water consumption at the property exceeds the expected rate of water consumption at the property.

In some implementations, determining the expected rate of water consumption at the property includes: receiving, from one or more sensors, sensor data that reflects an operating condition of each water consuming device at the property; and determining, based on the sensor data, the expected rate of water consumption at the property.

In some implementations, determining the expected rate of water consumption at the property includes: receiving, from one or more sensors, occupancy data that reflects an occupancy of the property; and determining, based on the occupancy data, the expected rate of water consumption at the property.

In some implementations, the expected rate of water consumption at the property is zero liters per hour.

In some implementations, the leak sensor includes one of an ultrasonic sensor, a thermal sensor, or a vortex shedding leak sensor.

In some implementations, the system includes a temperature sensor configured to measure temperature of water flowing through a pipe.

In some implementations, the system action includes one or more of i) sending a notification to a user or ii) throttling a water flow through a pipe.

In some implementations, throttling the water flow through the pipe includes sending, to an electronic actuator of a valve disc, a signal to adjust the valve disc to throttle the water flow through the pipe.

In some implementations, throttling the water flow through the pipe includes throttling the water flow through the pipe to achieve a flow rate of zero liters per hour through the pipe.

In some implementations, determining that the water leak is occurring at the property includes determining that a water flow rate through a pipe is greater than zero liters per hour for a time duration greater than a threshold time duration.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart of an example process for predicting whether a water leak exists associated with a predicted device found in a monitored property.

Like reference numbers and designations in the various drawings indicate like elements.

DETAILED DESCRIPTION

Figure 1:
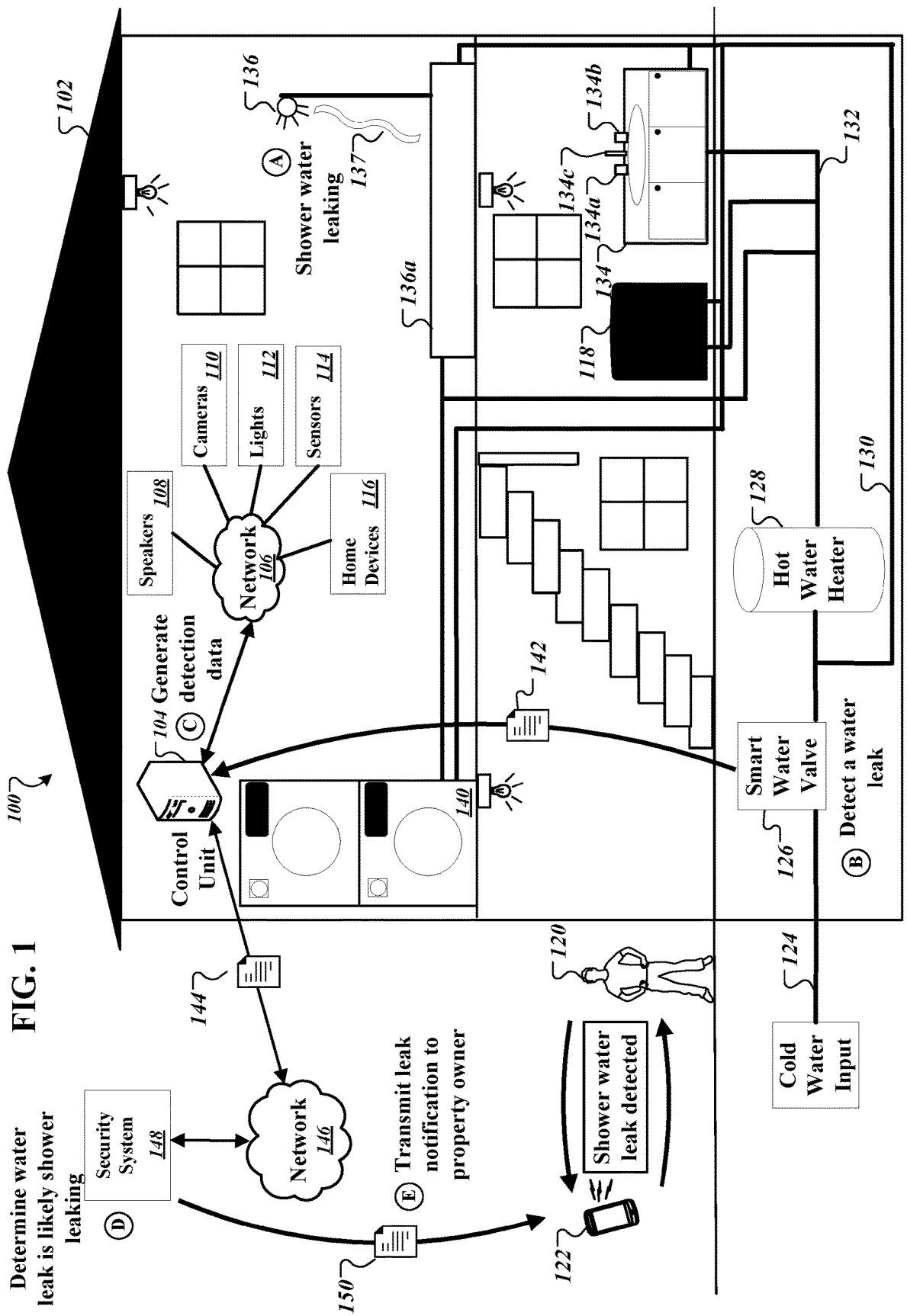
FIG. 1 is a contextual diagram of an example system for monitoring water systems in a monitored property.

The subject matter of the present disclosure is related to technique for using a smart water valve installed at a monitored property that measures water usage, provides information about water usage, detects water leaks found in the monitored property, controls the flow of water into the monitored property, and performs other functions. The smart water valve can be installed in various locations in line with a water main pipe that provides water to residential and commercial properties. The smart water valve can include a housing unit that uses various sensors for monitoring water flowing into the property from the main pipe. For example, the various sensors can monitor a wide range of flow rates that include a small leak at a faucet to a burst pipe in a bathroom. Additionally, the smart water valve can monitor water temperature at various locations throughout the monitored property and can monitor water consumption rates corresponding to devices found in the property as well as total consumption of water corresponding to those devices.

The smart water valve includes a water flow sensor that is capable of measuring a wide range of flow rates, such as high flow rates (3600 liters per hour or 60 liters per minute, for example), to ultra-low flow rates (0-6 liters per hour) in plumbing systems. The water flow sensor sits in line in the smart water valve with an electronically actuated disc and the water main. The electronically actuated disc can be, for example, a ball or plug that allows the smart water valve to throttle and shut off water flowing into the monitored property. Likewise, the smart water valve can configure the electronically actuated ball valve to allow a set amount of water to flow at a particular rate to the monitored property.

The smart water valve includes firmware and/or software that facilitate reading data from the sensors within its housing unit, making decisions based on data provided by the sensors, and reporting information to external components and recipients. The smart water valve can deliver data representing the sensors readings to a control unit server within the monitored property or to a security system external to the monitored property. Based on the readings from the sensors, the smart water valve can additionally perform other functions. For example, based on threshold values of flow rates, water consumption, and/or water temperature, the smart water valve can execute rules corresponding to user-desired criteria at the monitored property. These rules can include allowing water to flow at a particular flow rate, providing desired temperatures to a water heater found in the monitored property, actively transmitting notifications regarding the water characteristics to various client devices of the property owner, and detecting any trouble conditions corresponding to the water characteristics. The rules are configurable and allow the smart water valve to be controlled by a user or controlled by the security system external to the monitored property.

In some implementations, the smart water valve can include circuitry to perform processing on signals generated by systems that pump water into the monitored property. For example, the systems that pump water into the monitored property may generate low frequency signals that generate noise, which inhibit the water flow sensor (e.g., leak sensor) to properly detect whether a leak has occurred in the monitored property. In some implementations, the smart water valve can execute digital signal processing (DSP) algorithms or analog filtering techniques to separate the noise from the desired signal. The desired signal can then be used to detect whether a leak exists. In other implementations, the digital signal processing algorithms and the analog filtering techniques are not sufficient to separate the noise, and consequently, the smart water valve may include multiple one-way check valves in line with the water main line, which aid in removing the noise and facilitating the DSP algorithms and analog filtering techniques in separating the noise from the stable signal.

FIG. 1 is a contextual diagram of an example system 100 for monitoring water systems in a monitored property 102. Though system 100 is shown and described including a particular set of components including a control unit server 104, a network 106, speakers 108, cameras 110, lights 112, sensors 114, home devices 116, cold water input 124, smart water valve 126, water heater 128, cold water output 130, hot water output 132, network 146, security system 148, the present disclosure need not be so limited. In some implementations, the smart water valve 126 can be compatible with any hot water or cold water input and can be placed with a centralized or decentralized water source. In one example, the smart water valve 126 may be placed after the water heater 128 along the hot water output 132. Additionally, only a subset of the aforementioned components may be used to transmit water to the various devices with various water requirements in the monitored property 102. As an example, there may be implementations that do not use the cold water output 130. Similarly, there may be implementations that the smart water valve 126 exists within or is integrated within the water heater 128, rather than shown as a product existing independently in the system 100. Yet other alternative exemplary systems also fall within the scope of the present disclosure, such as a system 100 that does not use the control unit server 104. For these reasons, the system 100 should not be viewed as limiting the present disclosure to any particular set of necessary components.

The smart water valve 126 can monitor water usage in the monitored property 102. The smart water valve 126 can measure water usage of water consumption devices, detect water leaks found in the monitored property, controls flow of water into the monitored property 102, and transmits information about water usage. For example, the smart water valve 126 can sense water flowing into the monitored property 102 from the cold water input 124. Additionally, the smart water valve 126 can detect characteristics of water, such as a flow rate, a temperature, and likelihood of leaking. The smart water valve 126 can allow a particular flow rate of water to pass from the cold water input 124 to the water heater 128 and to the cold water output 130. The smart water valve 126 can be fully closed to allow no water to pass through, can be fully open to allow a maximum flow rate of water to pass through, or can be throttled to allow a flow rate that is less than the maximum flow rate.

In some implementations, the smart water valve 126 can detect changes in flow rate. Changes in flow rate can indicate water consumption devices in the monitored property 102 are consuming water. For example, a change in water flow rate may indicate water flowing from the showerhead 136, water flowing from the faucet 134c, water flowing to the dishwasher 118, and water flowing to the washing machine 140. Alternatively, changes in water flow rates can indicate leakages. For example, a leak can include a burst pipe, a pinhole leak in a pipe, a faucet 134c running water for an extended period of time, and a device leaking water. The smart water valve 126 can detect each of these water flows using its internal sensors and provide notifications to property owners and to the security system 148.

As shown in FIG. 1, a monitored property 102 owned by property owner 120 is monitored by a control unit server 104 that includes components within the monitored property 102. For example, the components within the monitored property 102 may include one or more speakers 108, one or more cameras 110, one or more lights 112, one or more sensors 114, and one or more home devices 116. The one or more cameras 110 may include video cameras that are located at the exterior of the monitored property 102 near a front door, as well as located at the interior of the monitored property 102 near the front door. For example, a video camera may be placed in the basement of the monitored property 102 for visually monitoring the smart water valve 126 and transmitting the images or video to the control unit server 104 to send to a client device 122 owned by the property owner 120.

The one or more sensors 114 can include a motion sensor located at the exterior of the monitored property 102, a front door sensor that is a contact sensor positioned at the front door, a pressure sensor that receives button presses at a light device, water flow sensors included in the smart water valve 126, sensors included in the water heater 128, and a lock sensor that is positioned at the front door and at each window within the monitored property 102. The contact sensor may sense whether the front door or the windows are in an open or closed position. The lock sensor may sense whether the front door and each window are in an unlocked or a locked position.

The water flow sensors included in the smart water valve 126 may sense a flow rate of the water provided throughout the monitored property 102. Additionally, the water flow sensors can be used to detect leaks throughout pipes in the monitored property 102. The sensors found within the water heater 128 may measure the temperature of the water coming in to the water heater 128 and the temperature of the water exiting the water heater 128.

In some implementations, the one or more home devices 116 may include home appliances such as a washing machine, a dryer, a dishwasher, an oven, a stove, a microwave, and a laptop, to name a few examples. The one or more home devices 116 may also include a humidity sensor that monitors an amount of humidity in each room of the monitored property 102. The control unit server 104 can adjust how much sun light is let in to the monitored property 102 by adjusting a movement of shades covering each of the windows in the monitored property 102. In some examples, e.g., if the monitored property 102 is a commercial facility, the one or more home devices 116 included in the commercial facility may include a printer, a copier, a vending machine, and a fax machine to name a few examples.

The control unit server 104 communicates over a wired or wireless connection over network 106 with connected devices such as each of the one or more speakers 108, one or more cameras 110, one or more lights 112, one or more sensors 114, and one or more home devices 116 (washing machine, a dryer, a dishwasher, an oven, a stove, a microwave, a laptop, etc.) to receive sensor data descriptive of events detected by the one or more cameras 110, the one or more lights 112, the one or more sensors 114, and the one or more home devices 116 in the monitored property 102. In some implementations, each of the connected devices may connect via Wi-Fi, Bluetooth, or any other protocol used to communicate over network 106 to the control unit server 104. The one or more speakers 108, the one or more cameras 110, the one or more lights 112, the one or more sensors 114, and the one or more home devices 116 can communicate with the security system 148 over the network 146 and bypass the control unit server 104.

Additionally, the control unit server 104 can communicate over a long-range wired or wireless connection with a security system 148 over network 158. In some implementations, the security system 148 is located remotely from the monitored property 102. In other implementations, the security system 148 is located locally at the monitored property 102 within the control unit server 104. The security system 148 communicates bi-directionally with the control unit server 104. Specifically, the security system 148 receives sensor data descriptive of events detected by the sensors included in the monitoring system of the monitored property 102. Additionally, the security system 148 can transmit instructions to the control unit server 104 for particular events. The control unit server 104 and the security system 148 can also communicate directly with the client device(s) of the property owner 120.

The security system 148 can monitor the monitored property 102, as well as other (and, perhaps, many more) monitoring systems located at different monitored properties that are owned or occupied by various users. For example, the security system 148 can monitor many monitored properties by zip code, county, or city. In other implementations, the security system 148 can monitor monitored properties within a neighborhood. The security system 148 can also communicate with plumbers and other maintenance dealers to dispatch technicians to fix issues found within the monitored property 102.

In some implementations, the security system 148 can store, train, and manage a machine-learning algorithm for each of the monitored properties. For example, the machine-learning algorithm can be trained with data provided from the control unit server 104, data provided by the smart water valve 126, and data associated with the security system 148 to predict devices that are leaking water. For example, the security system 160 can use a stored machine-learning algorithm such as a deep learning algorithm, an anomaly detecting algorithm, a linear regression algorithm, or a logistic regression algorithm, or a combination of various machine-learning algorithms, to name a few examples.

The security system 148 can train the machine-learning algorithm to perform a variety of tasks. For example, the security system 148 can train its stored machine-learning algorithm to predict which devices found in the monitored property are leaking water. The machine-learning algorithm can also be used to determine which devices consume water. For example, the machine-learning algorithm can determine whether water flowed from a faucet, a showerhead, a toilet flush, a dishwasher, or a washing machine, to name a few examples. The security system 148 can report this information to a property owner. For example, the security system 148 can report that over the past week, the faucet was used twenty times, the showerhead was used ten times, the washing machine was used once, and the dishwasher was used twice. This information can be beneficial to the user because the user can analyze his/her water usage in the monitored property on a per-device basis.

The security system 148 can use device water usage profiles corresponding to particular devices to train the machine-learning algorithm. The device water usage profiles describe how a particular device, such as a faucet, consumes and/or uses water. For example, the device water usage profile can describe a rate of water consumption by the faucet, a required amount of water provided by the water heater 128 when the faucet draws water, and potential leakage flow rates of the faucet.

Additionally, the device water usage profile can include timestamped data of previous water consumption events corresponding to the particular device. The device water usage profiles can be stored at the control unit server 104, the smart water valve 126, and the security system 148. This information can be iteratively fed into the machine-learning algorithm for training until the machine-learning algorithm outputs a likelihood of a device that corresponds to the device water usage profile. Additionally, the device water usage profile can include a duration of water flow, a temperature of the water, and low flow sensor information.

The smart water valve 126 and/or the control unit server 104 can detect water leakage in the monitored property 102. For example, the smart water valve 126 and the control unit server 104 can provide data characterizing the water leak to the security system 148. The security system 148 can provide the data characterizing the water leak to the trained machine-learning algorithm to generate a prediction corresponding to the device that is likely leaking water. Additionally, the security system 148 can train the machine-learning algorithm using data from the smart water valve 126 that shows a healthy water flow in system 100. This helps the trained machine-learning algorithm to distinguish between healthy systems 100 and systems leaking water. In other implementations, the smart water valve 126 and the control unit server 104 can detect and characterize the water leak to determine which device is likely leaking water. The trained machine-learning model may be stored on the control unit server 104. The smart water valve 126 may store device water usage profiles to determine which device is leaking water.

In some implementations, the security system 148 can also train the machine-learning algorithm to identify when water leaks have been fixed. For example, the security system 148 can use data over a particular period of time that shows smart water valve changing its detection from indicating a leak to not indicating a leak, and vice versa. This data can be monitored over a period, such as 2 hours to 5 hours, for example. Additionally, raw sensor data can be used to train the machine-learning algorithm. The raw sensor data can include media data (e.g., video and photos) from one or more cameras that monitor the monitored property 102, audio data from microphones recording sounds around the monitored property 102, data retrieved from an alarm panel showing issues provided by the smart water valve 126 and the control unit server 104, motion data from motion sensors in the monitored property 102, lock sensor data from the doors and/or windows, and other data provided by the sensors. Additionally, data provided from the client device 122 can be used to train the machine-learning algorithm. For example, the data can be user input data that indicates a leak found in the monitored property 102.

In some implementations, the security system 148 can add timestamp data to the transitioning training data to train the machine-learning algorithm to provide indications that the system 100 has transitioned from an issue state to a healthy state or transitioned from a healthy state to an issue state. The training can further be based on device-usage profiles or water leaks at other monitored properties monitored by the security system 148 that have similar components.

In some implementations, the security system 148 can produce a likelihood that a device found within the monitored property 102 is leaking. The likelihood can be a statistical likelihood, such as a percentage that indicates how likely the device is currently leaking water. The likelihood with the greatest value, for example, can be deemed the predicted device that is leaking water. The security system 148 can inform the property owner 120 of the possibility that the smart water valve 126 has detected a water leak with the predicted device. In particular, the security system 148 can transmit a notification to the client device 122 of the property owner 120. In response, the security system 148 can retrain the machine-learning algorithm if the property owner 120 provides a notification through the client device 122 indicating that the predicted device is not leaking water.

In some implementations, after the security system 148 has trained the machine-learning algorithm to a point where it can, with high accuracy, predict devices that are leaking water, the security system 148 can generate a trained model. The security system 148 can keep a copy of the trained model in its model as well as provide a copy of the trained model to the control unit server 104 corresponding to the monitored property 102. The security system 148 may generate a trained model for each property it is monitoring. Alternatively, the security system 148 may use the same trained model for each of its monitored properties.

By executing the trained model at the control unit server 104, the control unit server 104 can have quick access to a result of executing the trained model and quickly indicate to the property owner 120 that a predicted device is leaking water. In addition, the trained model at the control unit server 104 can monitor the data from the smart water valve 126, the speakers 108, the microphones, the cameras 110, the lights 112, the sensors 114, the thermostat, and the home devices 116. In response to providing the data from each of the devices in the monitored property 102 to the trained model, the trained model can produce a predicted device that is leaking based on the detection by the smart water valve 126. For example, the output can indicate a predicted likelihood corresponding to each of the devices in the monitored property, where the predicted likelihood indicates how likely the predicted device is leaking water. Alternatively, the trained model on the security system 148 can determine this prediction. Based on the predicted device with the highest or a range of high likelihoods, the control unit server 104 can transmit a notification to the client device 122 of the property owner 120 indicating of a potential leak with the corresponding devices.

By having a trained model on both the control unit server 104 and the security system 148, both models can be enforced to produce similar results when monitoring a property. For example, should the trained model on the control unit server 104 (or at the security system 148) receive a detection of a leak at the system 100 and predict the faucet in the bathroom is leaking and the trained model at the other location predict the shower head in the bathroom is leaking, the security system 148 and the control unit server 104 can communicate with one another to resolve the difference.

In some implementations, each time the trained model produces a predicted device that is leaking water at a particular location, the control unit server 104 and the security system 148 communicate with one another to determine if the two systems result in similar output. For example, if the control unit server 104's trained model produces an indication that the shower head is leaking water, the control unit server 104 can then provide the prediction along with input data to the security system 148 via the network 146 for the security system 148 to perform a similar execution. If the security system 148 determines its trained model produces a different output with the same input provided by the control unit server 104, then the security system 148 can train its trained model to predict that particular device is leaking water similar to the control unit server 104's trained model. This functionality also works in reverse and can work across different monitored properties.

As illustrated in system 100, the water heater 128 obtains cold water input 124 at the monitored property 102 from an external water supplier. For example, a municipal water supply may supply water using a pump, centrifugal, or other means to provide water at a predefined pressure to the monitored property 102. The water heater 128 may hold a reservoir of a predetermined amount of water. For example, the reservoir may range in size from 30 to 80 gallons, based on a make of the water heater 128. The water heater 128 may heat the obtained cold water input 124 to a designated temperature, based on temperatures set by the property owner 120 or a technician. For example, the water heater 128 may heat the obtained cold water input 124 in the reservoir to 120 degrees Fahrenheit (F). In some implementations, the external water supplier may provide the cold water input 124 at a constant temperature. For example, the cold water input 124 may be supplied at a constant temperature of 45 degrees F. In other implementations, the cold water input 124 may be supplied at varying temperatures. The cold water input 124 can branch off the main line before being provided as input to the water heater 128 to cold water output 130.

The water heater 128 may vary its amount of water found in the reservoir based on residents using various devices found in the monitored property that require water. For example, the dishwasher 118 may require 5 gallons of hot water three times during a one-hour period. In addition, the washing machine 140 may require 5 gallons of hot water and 6 gallons of cold water within a 15-minute period. In response, the reservoir of the water heater 128 may deplete. The water heater 128 thus draws more water from the cold water input 124 and has to heat up the newly acquired water in its reservoir to service other devices that require hot water. A property owner 120 may request hot water from the water heater 128 while in the shower or request hot water while running water at the sink 134. The water heater 128 accounts for water drawn by the various devices in the monitored property 102.

The property owner 120 may request hot water to be changed to a particular temperature in the water heater 128 using his/her client device 122. The client device 122 may display a web interface, an application, or a device specific for a smart home system. The client device 122 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 122 may communicate with the control unit server 104 using the network 106. The client device 122 may also communicate with the security system 148 using the network 146 through the application of the smart home system. The networks 146 and 106 may be wired or wireless or a combination of both and can include the Internet.

In some implementations, the property owner 120 may communicate with the client device 122 to activate a signature profile for the monitored property 102. To illustrate, the property owner 120 may first instruct the control unit server 104 to set a signature profile for arming the monitored property 102. For example, property owner 120 may use a voice command to say "Smart Home, Arm Home." The voice command may include a phrase, such as "Smart Home" to trigger the client device 122 to actively listen to a command following the phrase. Additionally, the phrase "Smart Home" may be a predefined user configured term to communicate with the client device 122. The client device 122 can send the voice command to the control unit server 104 over the network 106. The control unit server 104 may notify the security system 148 that monitored property 102 is to be armed. In addition, the control unit server 104 may set parameters to arm the monitored property 102 in response to receiving the voice command. Moreover, the control unit server 104 can send back a confirmation to the client device 122 in response to arming the monitored property 102 and setting the armed parameters. For example, the control unit server 104 may send back a response to display a message on the client device 122 that says "home armed."

By setting the signature profile, the control unit server 104 and/or the security system 148 knows who to contact in case the smart water valve detects a water leak at the monitored property and/or the trained model at either the control unit server 104 or the security system 148 predicts a device at the monitored property 102 that is leaking water. For example, once the armed home signature profile is set, the control unit server 104 immediately sends a notification to the client device 122 of the property owner 120 indicating to display a message to the property owner 120 that the monitored property 102 is armed. Should the smart water valve produce a detection that water is leaking or the trained model predict a device that is leaking water in the monitored property 102, the control unit server 104 can provide that detection and/or prediction to the client device 122 of the property owner 120. Additionally, the control unit server 104 can provide the detection and/or prediction to the security system 148 to verify its trained model produced similar results.

The control unit server 104 and the security system 148 can additionally log detection and prediction data. The detection and prediction data can be logged with a corresponding timestamp in memory. A timestamp indicative of when the smart water valve produces the detection and another timestamp for when the trained model produces the prediction can be stored in memory at the control unit server 104 and the security system 148. At a later point in time, a user, such as a property owner 120 or a plumber or other technician, can review the logs to determine the output of the trained model and the smart water valve 126.

In some implementations, users can enable rule-based events corresponding to the smart water valve 126. Through the client device 122 or interfacing directly with the smart water valve 126, a property owner 120 or other user can set up rules on the smart water valve 126. The rules can include threshold based flow rules and temperature event rules based on the water that flows through the smart water valve. In particular, the rules can use threshold values, time stamps, flow rates, and water temperature to execute responses. For example, a user can configure the smart water valve 126 to shut off water supply to the monitored property 102 if the rate of water from the cold water input 124 is above 24 gallons per minute. In another example, the smart water valve 126 can shut off water supply to the monitored property 102 if the water pressure from the cold water input 124 is supplied at a pressure less than 10 PSI. These values are configurable and can be changed based on the values of the components within the monitored property 102 and based on criteria set by the property owner 120. In another example, the property owner 120 may set criteria for the smart water valve to provide a notification if it detects a water leak in the monitored property 102 that reaches a threshold of 53 cubic inches per second. Other threshold values are possible. The smart water valve 126 may transmit a notification to the client device 122 of the property owner 120. Alternatively, the smart water valve 126 may activate its buzzer or activate an external buzzer, notifying individuals in the monitored property 102 of a potential leak. Additionally, the smart water valve 126 may close a valve allowing cold water input 124 to flow into the monitored property 102 should a potential leak be detected. Additionally, users located at the security system 148 may set rules and events at the smart water valve 126 remotely.

For example, during stage (A), the property owner 120 may set the parameters for the "arming home" signature profile that includes setting the configuration for the security system 148, the control unit server 104, and the smart water valve 126 to monitor for leaks at the monitored property 102. In some implementations, the control unit server 104, the corresponding sensors, and devices 116 found in the monitored property 102 can each be used to monitor for leaks, regardless of the signature set at the monitored property 102. For example, the control unit server 104 can retrieve data at various times throughout the day from the smart water valve 126, the speakers 108, the microphones, the cameras 110, the lights 112, the sensors 114, and the home devices 116. The control unit server 104 can poll each of these devices in the monitored property 102 every hour, 24 hours, or multiple times a week, to name a few examples.

The property owner 120 can set the period with which the control unit server 104 polls these devices. In response to receiving the data from each of these devices, the control unit server 104 can transmit the data from each of these devices to the security system 160. The detection data 144 can include raw sensor data, data indicating a water leak at the monitored property 102, and identification data corresponding to the monitored property 102.

As illustrated in system 100, showerhead 136 may leak water 137. The water 137 can be leaked at a particular rate and for a particular period of time, for example. The property owner 120 may be unaware that the water 137 is leaking from the showerhead 136. The water may leak from the showerhead 136 while the knob to turn on the shower is in the "OFF" position. Other devices in the monitored property may leak water, such as the washing machine 140, the faucet 134c of the kitchen sink, and the dishwasher 118. Alternatively, pipes may leak water, such as the cold water output 130 the hot water output 132.

During stage (B), the smart water valve 126 detects water leaking in the monitored property 102. The smart water valve 126 includes one or more sensors that monitor characteristics of water throughout the monitored property 102. For example, the sensors included within the smart water valve 126 can monitor flow rates of water from the cold water input 124, and temperature of water from the cold water input 124. The sensors may be flow sensors, leak sensors, and temperature sensors, to name a few examples. The smart water valve 126 may be able to poll data from these sensors to determine whether a water leak exists.

The smart water valve 126 can make the determination that a water leak exists based on comparing the data provided by the sensors to threshold values. For example, the smart water valve 126 can compare flow rate data provided by flow sensors to threshold values to determine whether a leak exists. A threshold value of 1 gallon per minute, for example, may be set as a threshold value for in order for the smart water valve 126 to indicate a leak. If the flow sensors indicate that water is flowing at a rate of at least 1.5 gallons per minute, the smart water valve 126 may indicate a leak has been detected. The smart water valve 126 can make an indication a leak exists by comparing the values of the data provided by the leak sensor to threshold values.

In some implementations, the sensors can monitor a wide range of flow rates. For example, the sensors can monitor ultra-low flow rates (e.g., zero to six liters per hour) to ultra-high flow rates (e.g., sixty to one hundred liters per minute). The smart water valve 126 can communicate with these flow sensors and compare their values to thresholds for potentially predicting whether a water leak exists. Additionally, the smart water valve 126 may include and communicate with leak sensors to detect whether a leak exists.

A leak sensor can use acoustics and frequency waves to determine whether a leak exists in a pipe. This is because a leak in a pipe typically exhibits a particular frequency that does not exist when a corresponding leak does not exist. The leak sensor can detect this particular frequency and transmit data representing this particular frequency to the smart water valve 126 indicating a leak has been detected. The smart water valve 126 can take further processing steps (e.g., comparing the frequency and its amplitude values to a threshold, comparing reliability of the leak sensor to a threshold) to determine whether the viability of the leak sensor's data is valid, and thus, indicate whether a leak exists. The smart water valve 126 can transmit this data to other components within the monitored property 102 once determined that a leak does in fact exist.

During stage (C), the control unit server 104 generates data to transmit to the security system 148 for predicting a device that is likely leaking water. In particular, the control unit server 104 retrieves data from the microphones, data from the sensors 114, and media from the cameras 110 that monitor areas around the monitored property 102. For example, the control unit server 104 may retrieve media and sensor data from corresponding cameras and sensors that monitor water consumption devices. These water consumption devices can include the dishwasher 118, the sink 134, the washing machine 140, and the shower 136a, to name a few examples.

The control unit server 104 can retrieve data from the cameras and sensors over the past hour, two hours, or week, for example, to include within the data to provide to the security system 148. The security system 148 benefits from having other sensors' data to predict whether a device is leaking water because the security system 148 can use this data in conjunction with data provided by the smart water valve 126 to improve its prediction ability. For example, if the media data shows water is leaking from the sink 134, and leak data 142 indicates that a leak exists from the faucet 134c of the sink 134, then the security system 148 may determine with a higher likelihood that water is currently leaking from the sink 134. In another example, if motion data and occupancy data indicates that no person is in the monitored property, yet toilet water is running, this may indicate a potential leak with the toilet.

During stage (D), the control unit server 104 transmits the detection data 144 to the security system 148 over the network 146. In some implementations, the control unit server 104 may store the detection data 144 in memory, at an external storage location, and transmit a location (e.g., index or pointer) to the security system 148. The security system 148 can use the received location data to access the external storage location to retrieve the detection data 144. The detection data 144 may be stored in the external storage location using an index or another pointer data type instead of transmitted over the network 146 if the size of the detection data 144 is greater than a particular threshold, in order to maintain small bandwidth constraints. For example, the media data included in the detection data 144 recorded by the cameras 110 may be greater than 10 GB.

The security system 148 can execute analytics on the received detection data 144 in order to predict a device that is likely leaking water. In particular, the security system 148 can provide the detection data 144 to a trained machine-learning model to produce an indication of the device that is potentially leaking water. The trained machine-learning model may output a statistical likelihood for each device found in the monitored property 102 that could leak water. The security system 148 can compare each statistical likelihood output by the trained machine-learning model to a threshold, and save the statistical likelihoods that are greater than the threshold. In other implementations, the security system 148 can retrieve the statistical likelihood that is closest to 100% and flag the corresponding device as the device that is leaking water.

In some implementations, the security system 148 may analyze the received detection data 144 in view of the device water usage profiles corresponding to devices found in the monitored property 102. For example, given that the device water usage profiles describes how a particular device consumes water, such as a faucet, or shower head, for example, the security system 148 can compare characteristics from a corresponding device water usage profile to the data found in the detection data 144. The security system 148 can compare the water flow rates from each of the device water usage profiles to flow rates found in the detection data 144. Additionally, the security system 148 can compare the temperature of the water found in the detection data 144 to the temperature described in each of the device water usage profiles. Based on the comparison, the security system 148 can determine which device water usage profile most closely matches the data in the detection data 144. For example, the results of the comparison may be a statistical match, such as a 90% match or other comparison type. The security system 148 can determine which device water usage profile most closely matches to the detection data 144, and deem the corresponding device as the device that is likely leaking. Additionally, the detection data 144 may be combined with other data types to improve its detection of a device that is likely leaking. In other implementations, the smart water valve 126 may analyze the detection data 144 and perform the comparison.

The data from the sensors and media can be used to narrow down the amount of device water usage profiles that are compared to the data found in the detection data 144. For example, the security system 148 can determine from the media and sensor data locations in the monitored property 102 where a potential leak occurs. This can include the bathroom and the kitchen, for example. Additionally, using the sensor data, the security system 148 can remove any water device-usage profiles shown where sensor data is monitored for motion data. For example, if motion data is present in areas within proximity to water consumption devices, the security system 148 may remove the corresponding device water usage profiles as a user would have reviewed water consumption devices in which they are located. Thus, any water consumption device (and corresponding device water usage profile) not found in the kitchen and bathroom will not be used in the comparison to the detection data 144. Therefore, by using the media and sensor data in conjunction with the detection data from the smart water valve 126, the number of device water usage profiles can be minimized in determining which device water usage profile more closes resembles the data found in the received detection data 144.

In other implementations, the smart water valve 126 may perform the functions of analyzing the received detection data 144 in view of the device water usage profiles. The smart water valve 126 can compare the characteristics from each of the device water usage profiles to the data in the detection data 144 to determine which device is likely leaking water. Similarly, the control unit server 104 can perform these functions. The control unit server 104 can also compare the received detection data 144 to media and sensor data provided by sensors found in the monitored property 102 to assist with determining a device that is likely leaking water.

The security system 148 can use the trained machine-learning algorithm in conjunction with comparing the received detection data 144 to the device water usage profiles to improve the detection of a device that is potentially leaking water. For example, the security system 148 may provide the detection data 144 as input to the trained machine-learning algorithm and retrieve the likelihood outputs from the trained machine-learning algorithm likelihood(s) that are greater than a threshold. The likelihood(s) greater than the threshold (such as, 50%) correspond to devices that may be potentially leaking water. Using the device water usage profiles that correspond to the devices having likelihoods that are greater than the threshold, the security system 148 can verify the accuracy of its trained machine-learning algorithm by comparing the characteristics from the received detection data 144 to those device water usage profiles having likelihoods that are greater than the threshold. The security system 148 may perform this additional step to determine whether the output of the trained machine-learning algorithm is valid or to determine whether the trained machine-learning algorithm requires retraining. If the security system 148 determines the trained machine-learning algorithm is accurate based on its comparison of the corresponding device water usage profile to the received detection data 144, then the security system 148 can log in memory the water consumption device that is likely leaking, along with a timestamp. Alternatively, if the comparison indicates that the output of the trained machine-learning algorithm is incorrect and that another device water usage profile corresponding to a device more closely resembles the data provided by the received detection data 144, the security system 148 can retrain the trained machine-learning algorithm with the indication of the correct device and the data from the received detection data 144. This training is an iterative process, and can be performed until the machine-learning model's output is that of the correct device.

During stage (E), the security system 148 can transmit a notification 150 to the client device 122 of the property owner 120. In particular, the notification 150 can indicate to the property owner 120 that the predicted or determined device is potentially leaking water. For example, the notification can recite, "Shower head is potentially leaking water." Alternatively, the security system 148 can call the client device 122 and leave a recording that indicates that the showerhead 136 is potentially leaking in the monitored property 102. Additionally, the security system 148 can request that the property owner 120 verify whether the showerhead 136 is in fact leaking water and whether a technician, such as a plumber, should be dispatched to the monitored property 102 should the showerhead 136 be leaking water. In other implementations, if the smart water valve 126 performed this comparison, the smart water valve 126 can transmit the notification 150 to the client device 122 of the property owner 120. The smart water valve 126 can transmit the notification 150 over ZigBee, Z-Wave, CAT-M, Bluetooth, WiFi, or another communication protocol, to name a few examples.

In some implementations, the property owner 120 can interact with his/her client device 122 to provide a response to the security system 148's request. For example, the property owner 120 can speak to the client device 122 or interact with the keys or screen of the smart home application on the client device 122 to provide a response whether the showerhead 136 is leaking water. The property owner 120 may open an application on his/her client device 122, such as a smart home application, to be able to communicate with the control unit server 104 or communicate with a user or computer located at the security system 148. The property owner 120 can indicate through his/her client device 122 various responses. The responses can indicate that the showerhead 136 is not leaking, that the showerhead 136 is in fact leaking, or that the showerhead 136 is not leaking but another device, such as the faucet 134c at the sink 134 is leaking.

The security system 148 can receive the response from the client device 122 can proceed based on the response. For example, if the response indicates that the property owner 120 does not notice the showerhead 136 leaking, the security system 148 can indicate to the property owner 120 that they will dispatch a technician (e.g., a plumber) to verify that the showerhead 136 is not leaking. In other implementations, the security system 148 can ask whether the property owner 120 requests that a technician be dispatched to verify that the showerhead 136 is not leaking.

In some implementations, if the response provided by the property owner 120 indicates that the showerhead 136 is leaking, the security system 148 can notify the property owner 120 that a technician will be dispatched to fix the leak. Similarly to the example above, in some implementations, the security system 148 can ask the property owner 120 whether a technician should be dispatched or will the property owner 120 fix the leak. If the property owner 120 indicates no technician should be dispatched, the security system 148 can discard the notification from the property owner 120 and can store in memory that it correctly predicted the device (e.g., the showerhead 136) leaking water.

In other implementations, if the response provided by the property owner 120 indicates that the showerhead 136 is not leaking but the faucet 134c at the sink 134 is leaking, the security system 148 can use this data to update its trained model and determine whether the property owner 120 requests for a technician. For example, the security system 148 can retrain the trained machine-learning model with training data that includes the water device-usage profile of the faucet 134c and the received leak data 142 with an indication corresponding to the faucet 134c leaking as input to the trained machine-learning model. The security system 148 can iteratively train the machine-learning model with the training data until the output predicts the faucet 134c as the device that is potentially leaking. If a technician is requested for, the security system 148 can dispatch a technician. Once the machine-learning model if sufficiently trained, the security system 148 can store the retrained model in memory and transmit the retrained model to the control unit server 104.

Figure 2:
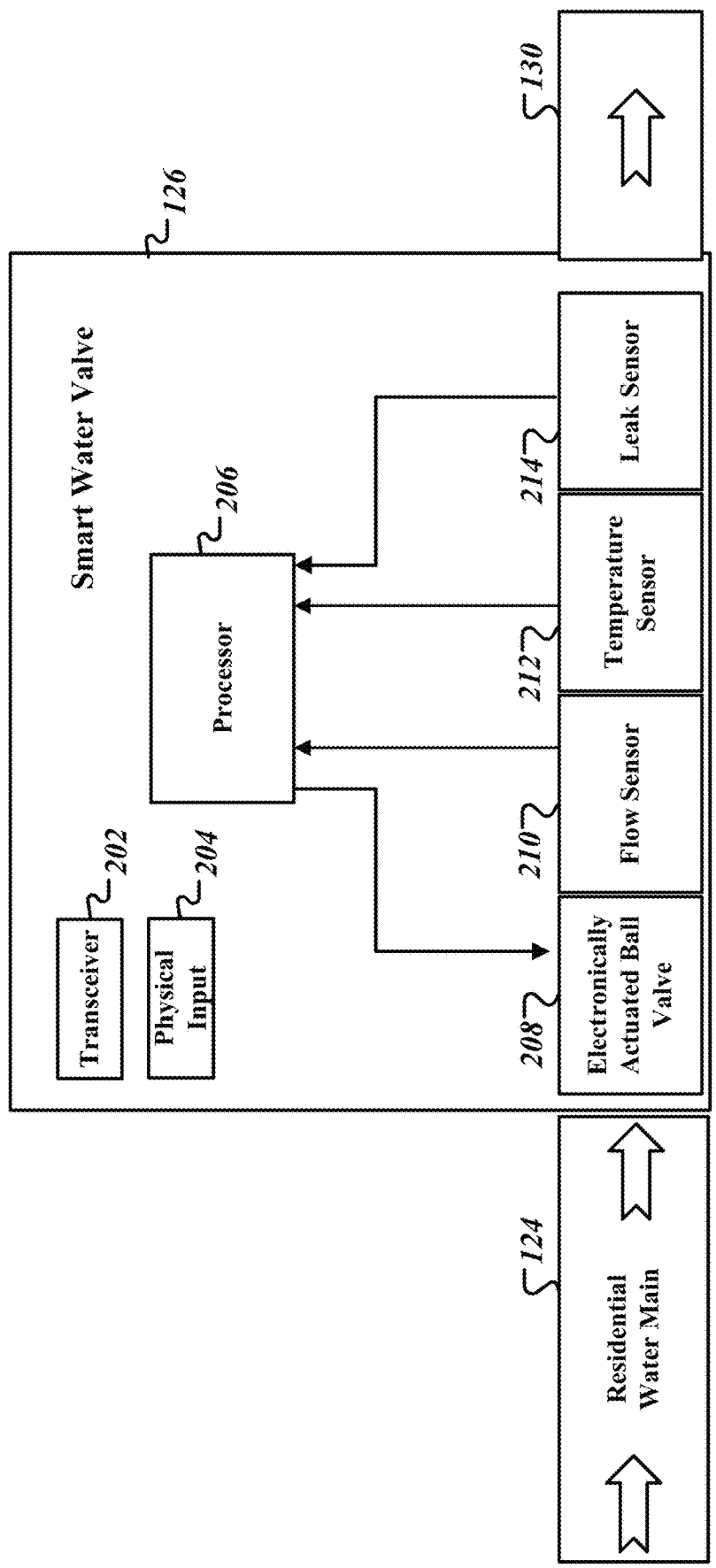
FIG. 2 is a contextual block diagram of an example system of a smart water valve for monitoring water systems in a monitored property.

FIG. 2 is a contextual block diagram of an example system of a smart water valve 126 for monitoring water systems in a monitored property. In particular, the smart water valve 126 monitors water consumption devices within the monitored property 102. The smart water valve 126 is positioned along a pipe, e.g., between the cold water input 124, which may be a water main pipe, and the cold water output 130. The water main pipe can provide water to residential or commercial properties from external water sources. The cold water output 130 can provide water to a water heater or to other plumbing pipes to carry water to the water consumption devices in the monitored property 102.

The smart water valve 126 illustrates the various components that can be used to monitor water consumption activities in the monitored property. In particular, the smart water valve 126 can include a transceiver 202, a physical input module 204, a processor 206, an electronically actuated valve disc, e.g., electronically actuated ball valve 208, a flow sensor 210, a temperature sensor 212, and a leak sensor 214. Each of these components within the smart water valve 126 can be connected in the manner shown, or may be connected in a different manner. Additionally, each of the components within the smart water valve 126 can communicate with one another. For example, the processor 206 may communicate in a bi-directional manner with each of the transceiver 202, physical input module 204, electronically actuated ball valve 208, flow sensor 210, temperature sensor 212, and leak sensor 214.

In some implementations, the flow sensor 210, the temperature sensor 212, and leak sensor 214 may be contained within the smart water valve 126. These sensors can be placed along pipe locations within the smart water valve 126 within proximity to one another. In other implementations, the smart water valve 126 can communicate with other sensors, e.g., water or leak detection sensors, within the monitored property 102 to improve its leak detection abilities. For example, the other sensors may be placed near particular water consumption devices to improve the smart water valve 126's accuracy of detecting a leak corresponding to a particular water consumption device. These sensors placed in various locations throughout the monitored property 102 can communicate wirelessly with the smart water valve 126 through its transceiver 202.

In some implementations, the transceiver 202 can include one or more software and hardware components that allow the smart water valve 126 to communicate with external components. For example, the transceiver 202 can include an antenna that allows the smart water valve 126 to transmit and receive messages from the control unit server 104 and the security system 148. Additionally, the transceiver 202 can communicate with the client device 122 of the property owner 120. The transceiver 202 may communicate over Ethernet, CAT-M, Z-Wave, ZigBee, Bluetooth, WiFi, or any other wireless communication protocol. The transceiver 202 can relay information that it receives from external communicates to the processor 206 over one or more communication buses, and vice versa.

The physical input module 204 can include one or more software and hardware components that allow an individual to interact with the smart water valve 126. In particular, the physical input module 204 can include a touch-screen display and one more interactive buttons that allow a user, such as a property owner 120 or technician, to interface with the smart water valve 126. For example, an individual may tap on buttons on the touch-screen display, interact with keys on the keyboard, or speak to the smart water valve 126 in order to provide instructions to the smart water valve 126. The physical input module 204 can translate the interactions provided by the user into instructions and transmit those instructions to the processor 206 over one or more communication buses.

In some implementations, the user interacting with the physical input module 204 can provide various instructions and settings to the smart water valve 126. For example, the user can enter can configure a number of sensors found in the monitored property 102 that can communicate with the smart water valve 126. The user can configure the communication protocol and a type of sensor for each of the sensors.

Additionally, the user can configure rules, events, and thresholds for the smart water valve 126 through the physical input module 204. For example, the user can interact with the components of the physical input module 204 to set rules that notify devices of detected events. For example, if the leak sensor 214 produces data, a rule can be set that the control unit server 104 and the client device 122 of the property owner 120 are immediately notified. In another example, the user can set another rule that instructs the electronically actuated ball valve 208 to close in response to the leak sensor 214 detecting a leak in the monitored property 102. Other rules are possible and configurable through a client device 122 of property owner 120 or through a user located at the security system 148.

The processor 206 can perform the decision making for the smart water valve 126. In particular, the processor 206 can include one or more hardware and software components for monitoring the water consumption devices in the monitored property 102. The smart water valve 126 is installed in line with the residential or commercial water main and its processor 206 monitors data provided by multiple sensors found within and external to the smart water valve 126. The processor 206 uses the data provided by the sensors to execute rules stored by the user. For example, the processor 206 can receive sensor data from the flow sensor 210, the temperature sensor 212, and the leak sensor 214. In response to receiving the sensor data, the processor 206 can determine from the received sensor data to shut the valve of the electronically actuated ball valve 208 so water does not flow from the cold water input 124 to the cold water output 130. In another example, the processor 206 can poll the sensors at various times to retrieve sensor data from the sensors. In another example, the processor 206 can report data to other devices based on threshold based flow events and temperature event rules.

In some implementations, the smart water valve 126 can generate reports to provide to external devices. The reports can include data provided by the sensors over a predetermined period, historical events that have been triggered by the sensor data, data identifying the location of the smart water valve 126, water usage statistics of the monitored property 102, and detected water leaking events. For example, the smart water valve 126 can transmit data of values provided by the flow sensor 210, the temperature sensor 212, and the leak sensor 214 over the past month. In another example, the smart water valve 126 can transmit data of past events showing data provided by the temperature sensor 212 tripped the threshold indicating that water temperature is higher than usual. In another example, the data identifying the location of the smart water valve 126 can include GPS locational coordinates and/or an address of the monitored property 102 where the smart water valve 126 is located. The water usage statistics can include how often and for how long the water consumption devices are utilized in the monitored property 102. Lastly, the detected water leaking events can include data of events that show data provided by the leak sensor 212 has exceeded a threshold value indicating a likelihood of a leak in the monitored property 102. The smart water valve 126 can transmit these reports to a client device 122 of a property owner 120, through the display of the physical input module 204, to the control unit server 104, and to the security system 148, to name a few examples.

The electronically actuated disc, e.g., the electronically actuated ball valve 208 (referred to as "ball valve 208") can sit in line with the cold water input 124. In some implementations, the ball valve 208 can be located outside the smart water valve 126. In other implementations, the ball valve 208 can be located within the smart water valve 126. The ball valve 208 can be a spherical disc that adjusts how much water passes through the smart water valve 126, and subsequently enters the monitored property 102. A user can activate movement of the ball valve 208 either locally or remotely. For example, locally, a user can interact with the buttons on the smart water valve 126 to adjust a position of the ball valve 208 to allow a particular flow of water from the cold water input 124. Additionally, a user can activate movement of the ball valve 208 through his/her client device 122 by interacting with the smart home application. In other examples, a user can remotely interact with the position of the ball valve 208 by transmitting messages from the security system 148. For example, the ball valve 208 can be in an open position, a closed position, or located in a position between open and close. In some implementations, the ball valve 208 can be closed based on certain flow thresholds being reached. Thus, if a flow threshold is reached, the ball valve 208 moves to a closed position so no water from the cold water input 124 flows into the monitored property 102.

Though described as a ball valve, the electronically actuated disc can be any appropriate type of valve disc that is capable of throttling or stopping water flow through a pipe. For example, the electronically actuated disc can be a plug, a butterfly disc, a needle disc, or a globe disc.

In some implementations, the security system 148 can transmit commands to the smart water valve 126 in response to generating predictions of water leakages. For example, in response to the security system 148 predicting that water is leaking at a particular device within the monitored property 102, the security system 148 can transmit a command to the smart water valve 126 to move the position of the ball valve 208 to close. Similarly, the security system 148 can transmit a command to the smart water valve 126 to move the position of the ball valve 208 to open in response to the trained machine-learning model predicting no device is leaking water. Alternatively, the security system 148 can transmit a command to the smart water valve 126 to move the position of the ball valve 208 to allow a desired flow rate of water to be provided to the monitored property 102.

In some implementations, the smart water valve 126 communicates with a flow sensor 210 and a temperature sensor 212. The flow sensor 210 measures flow rates of water and the temperature sensor 212 measures the water temperature. In particular, the flow sensor 210 may measure the flow rate of water within a specified range of flow rates. For example, the flow sensor 210 can measure the flow rate of water from 180 liters per hour to 3600 liters per hour. In some implementations, the flow sensor 210 can include multiple flow sensors, each flow sensor used for different applications and detecting different ranges of flow rates. For example, the flow sensor 210 can include three flow sensors, the first flow sensor measuring flow rates between 120-2400 liters per hour; the second flow sensor measuring flow rates between 180-3600 liters per hour; and the third flow sensor measuring flow rates between 300-3600 liters per hour.

The flow sensor 210 will not measure any flow rate outside the specified range. Similarly, the temperature sensor 212 measures the water temperature within a specified range of temperatures. The processor 206 can poll the flow sensor 210 and the temperature sensor 212 for data. Additionally, the flow sensor 210 and the temperature sensor 212 can transmit corresponding data to the processor 206 over a predetermined period. In one example, the flow sensor 210 can include a vortex flow meter that operates under a vortex shedding principle, where oscillating vortexes occur when water flows past a portion of physical component. The oscillation of the vortexes is directly proportional to the flow rate of the water. However, a certain flow rate is required before the flow sensor 210 (e.g., a vortex shedding sensor) can detect a flow rate.

The leak sensor 214 is similar to the flow sensor 210. The leak sensor 214 can detect lower flow rates that the flow sensor 210 is not able to detect. For example, the flow sensor 210 can detect flow rates of water from 180 liters per hour to 3600 liters per hour. The leak sensor 214 can then detect flow rates of water from 0 liters per hour to 6 liter per hour. A benefit of including the leak sensor 214 in conjunction with the flow sensor 210 is that it allows the smart water valve 126 to monitor a wide range of flow rates not typically measured by single flow sensors. In some implementations, the leak sensor 214 is temperature differential sensor.

The smart water valve 126 can also perform various water measurements throughout the pipes and water consumption devices in the monitored property 102. The water measurements can include a high flow event, a medium flow event, a leak condition event, a high temperature event, and a low temperature event. The high flow event can include a measurement of a high flow rate. For example, the smart water valve 126 can detect a burst water pipe using the flow sensor 210. The medium flow event can include a measurement of a medium flow rate. For example, the flow sensor 210 may detect water flowing in a faucet 134c for an extended period of time, such as ten hours. The high temperature event can include a measurement of water temperature that is above a threshold. For example, the smart water valve 126 may detect water flowing a temperature that is sufficiently high enough to damage internal components of the smart water valve or other water consumption devices in the monitored property 102. If the temperature sensor 212 detects the temperature being sufficiently high, the smart water valve 126 may shut the valve of the ball valve 208 to cease hot water flowing into the monitored property 102. Lastly, the low temperature event can include a measurement of water temperature that is below a threshold. For example, if the temperature sensor 212 detects water that is below 32 degrees F. on the cold water input 124, the smart water valve 126 can shut the ball valve 208 to cease the freezing water flowing into the monitored property 102. Additionally, the processor 206 can transmit a notification to the property owner 120 or to the control unit server 104 indicating that the ball valve 208 has closed.

Figure 3:
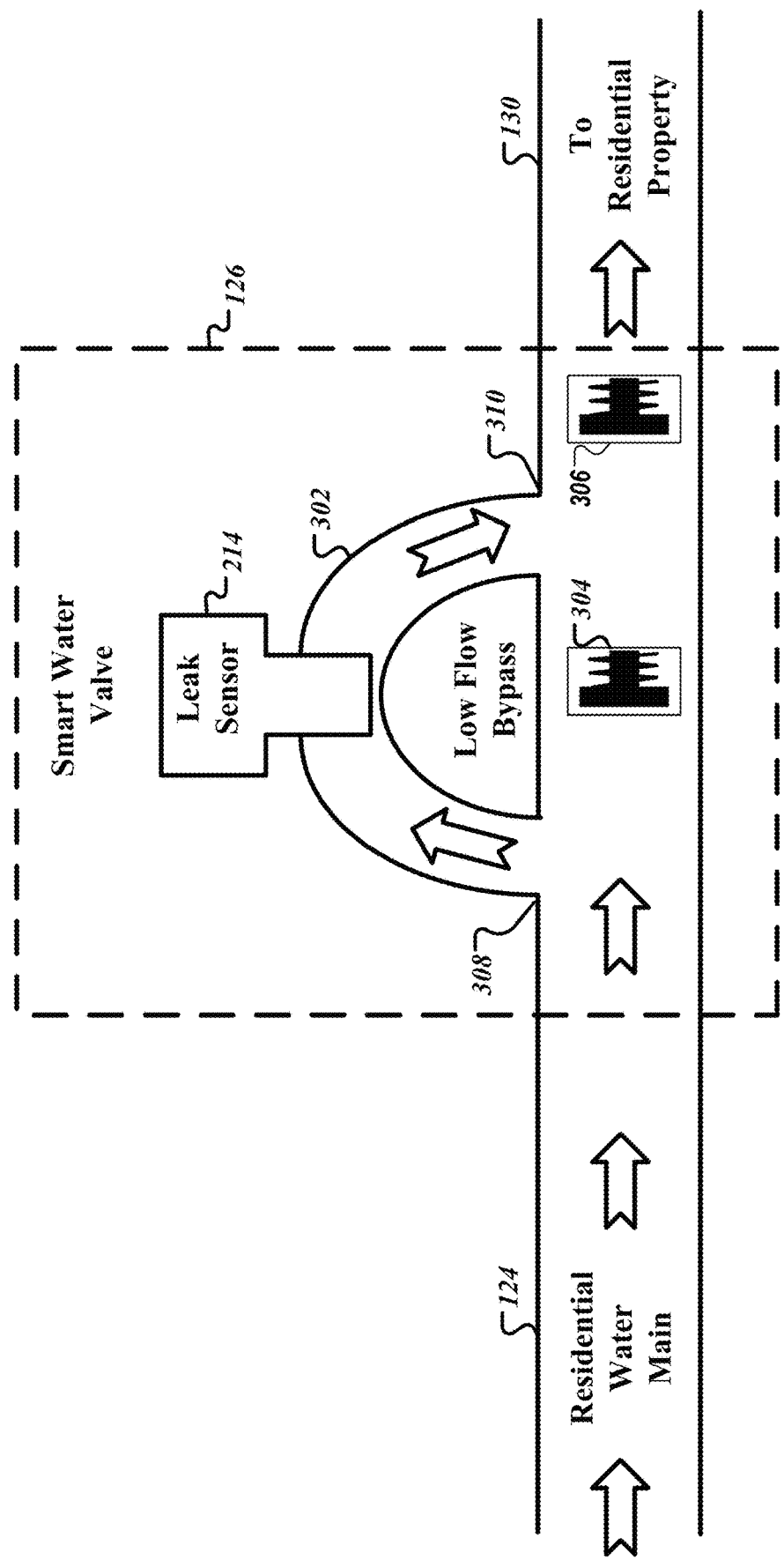
FIG. 3 is another contextual block diagram of a low flow detection system of a smart water valve for monitoring water systems in a monitored property.

FIG. 3 is another contextual block diagram of an example system of smart water valve 126 for monitoring water systems in a monitored property. The example system shown in FIG. 3 is similar to the system shown in FIG. 2. In particular, the example system of FIG. 3 includes a cold water input 124, a smart water valve 126, and a cold water output 130. The smart water valve 126 includes a leak sensor 214, a low flow bypass channel 302, a first check valve 304, and a second check valve 306. In some implementations, when a smart water valve 126 is placed in line with a cold water input 124, the leak sensor 214 might not be able to accurately detect a leak or no-leak in the monitored property 102 without sufficient digital signal processing techniques or analog filtering techniques.

In some implementations, a baseline level of noise is generated when the smart water valve 126 is placed in line at the cold water input 124. The baseline level of noise is seen by the leak sensor 214, which makes it difficult for the leak sensor 214 to determine whether a leak is occurring at the monitored property 102. An external water source can use a mechanism, such as a pump, a centrifugal, or another pressurized system, to provide water to the cold water input 124. This mechanism for providing water pressure can generate low frequency pressure waves in the plumbing. The low frequency pressure waves travel down the cold water input 124 and into the smart water valve 126. The leak sensor 214, which can be a thermal-shedding sensor, measures flow rates by measuring the temperature differential between a heated element and a non-heated element. The leak sensor 214 will not be able to accurately separate the minute movement of water generated by the low frequency pressure waves and the signal generated by the leak. In particular, the pressure waves cause a small amount of water to flow inside the monitored property's plumbing system and through the smart water valve. The low flow sensor, which is capable of sensing extremely low flow rates, can detect the displacement of water which create a noisy signal. Consequently, the leak sensor 214 will not be able to accurate detect a water leak due to the noisy signal. This low frequency noise signal exists in residential monitored properties and requires signal-processing techniques for signal extraction.

Thus, the smart water valve 126 can perform one or more signal processing techniques to separate the noise (e.g., the low frequency pressure wave) from the signal generated by the low flow leak (e.g., the stable signal). The one or more signal processing techniques can extract and separate the low frequency noise signal from the stable signal. The stable signal is analyzed by the smart water valve 126 in determining whether a leak or no-leak exists in the monitored property 102. In particular, the stable signal can indicate a flow rate that can be detected by the smart water valve 126.

In other implementations, the low frequency signal generated by the mechanisms that provide water pressure may generate significant noise that may be too difficult for signal processing techniques to overcome. In particular, the low frequency signal may have a high amplitude and a slow enough period that cannot be easily removed with digital signal processing or analog filtering techniques. Thus, the leak sensor 214 can be reorganized in the smart water valve 126 to address this issue. For example, the smart water valve 126 can be fitted with multiple check valves, such as a first check valve 304 and a second check valve 306, to address the noise issue. In some implementations, the first check valve 304 is used to divert water flow that has a flow rate below a threshold flow rate to the low flow bypass channel 302. For example, the threshold flow rate can be set to 60 liters per hour. If the flow rate of water increases past the threshold flow rate (e.g., 60 liters per hour), then the water is allowed to pass through the first check valve 304.

The second check valve 306 is designed to eliminate an amount of water back flowing through the low flow bypass channel 302. The back flowing of water through the low flow bypass channel 302 can be caused by pressure fluctuations from the pump system providing water to the cold water input 124, water flowing through the smart water valve 126, and other pressure generated by water flowing into the monitored property 102. By incorporating the second check valve 306, the amount of noise (e.g., low-pressure wave fluctuations) can be minimized. Thus, the leak sensor 214 can see a minimized noise signal when determining whether a leak exists. The smart water valve 126 can then remove the minimized noise signal using signal processing and/or analog filtering techniques. Thus, by incorporating a first check valve 304 and a second check valve 306 into the smart water valve 126, the noise can be significantly reduced when the smart water valve 126 makes a determination of whether a leak exists.

FIG. 4 is a flowchart of an example process 400 for predicting whether a water leak exists associated with a predicted device found in a monitored property. The process 400 can be performed by one or more computer systems, for example, the smart water valve 126 of the system 100. In some implementations, some or all of the process can be performed by the control unit server 104 or the security system 148 of the system 100, or by another computer system.

Generally, the process 400 includes determining that a water leak is occurring at a property, determining that a water usage profile of a particular water consuming device matches characteristics of the water leak, identifying a water consuming device that is likely leaking, and performing a system action.

In more detail, the process 400 includes determining with a leak sensor that a water leak is occurring at a property (402). The leak sensor can include one of an ultrasonic sensor, a thermal sensor, or a vortex shedding leak sensor. The leak sensor can be a component of a smart water valve, e.g., the smart water valve 126. The leak sensor can be positioned in a low flow bypass connecting to a pipe at each of an upstream connection and a downstream connection. For example, the leak sensor 214 can be positioned in the low flow bypass channel 302 connecting to the cold water input 124. The low flow bypass channel 302 can connect to the cold water input 124 at each of an upstream connection 308 and a downstream connection 310. The system can include a first check valve positioned in the pipe at a location between the upstream connection and the downstream connection, and a second check valve positioned in the pipe at a location downstream from the downstream connection. For example, the system can include the first check valve 304 positioned in the cold water input 124 at a location between the upstream connection 308 and the downstream connection 310. The system can also include the second check valve 306 positioned in the cold water input 124 at a location downstream from the downstream connection 310.

Determining with a leak sensor that a water leak is occurring at the property can include determining an expected rate of water consumption at the property, determining a current rate of water consumption at the property, and determining that the current rate of water consumption at the property exceeds the expected rate of water consumption at the property. Determining the expected rate of water consumption at the property can include receiving, from one or more sensors, sensor data that reflects an operating condition of each water consuming device at the property. For example, sensor data can include an on/off status of each water consuming device at the property 102. Sensor data can also include, for example, video image data, motion sensor data, and audio data that indicate an operating condition of a water consuming device. For example, when the washing machine 140 is operating in a laundry room, video images of the laundry room may show illuminated lights on a panel of the washing machine 140 and/or images of clothing rotating in the drum of the washing machine 140. Additionally, audio data from the laundry room may include sounds of the washing machine running. Thus, the sensor data, including the video images and the audio data, reflects that the washing machine is on.

The smart water valve 126 can determine, based on the sensor data, the expected rate of water consumption at the property 102. For example, the sensor data may reflect that all water consuming devices at the property 102 are off. Therefore, based on the sensor data, the smart water valve 126 can determine that the expected rate of water consumption at the property 102 is zero liters per hour.

Determining the expected rate of water consumption at the property can include receiving, from one or more sensors, occupancy data that reflects an occupancy of the property. For example, occupancy data can include an estimated occupancy of the property 102 based on motion sensor data, video image data, audio data, monitoring system arming status, etc. The occupancy data may reflect that the property 102 is unoccupied. The smart water valve 126 can determine, based on the occupancy data, the expected rate of water consumption at the property 102. For example, based on the occupancy data reflecting that the property 102 is unoccupied, the smart water valve 126 may determine that the expected rate of water consumption at the property 102 is zero liters per hour.

The smart water valve 126 can determine a current rate of water consumption at the property 102, e.g., using the leak sensor. Determining with a leak sensor that a water leak is occurring at the property can include determining that a water flow rate through a pipe, e.g., the cold water input 124, is greater than zero liters per hour. In some cases, the leak sensor 214 may determine that the water flow rate through the pipe is greater than zero liters per hour and less than six liters per hour. For example, the leak sensor 214 may determine that the water flow rate through the cold water input 124 is 0.5 liters per hour.

In some examples, determining with a leak sensor that a water leak is occurring at the property can include determining that the water flow rate through the pipe is greater than zero liters per hour for a time duration that is greater than a threshold time duration. For example, a threshold time duration may be twenty minutes. The smart water valve 126 may determine that the water flow rate through the cold water input 124 is 1.0 liters per hour for a time duration of twenty-one minutes. Thus, the smart water valve 126 can determine that the water flow rate through the pipe is greater than zero liters per hour for a time duration that is greater than the threshold time duration.

The smart water valve 126 can determine that the current rate of water consumption at the property 102 exceeds the expected rate of water consumption at the property 102. For example, the smart water valve 126 can determine that the current rate of water consumption at the property 102 of 0.5 liters per hour exceeds the expected rate of water consumption at the property 102 of zero liters per hour.

In some examples, the smart water valve 126 can determine that the current rate of water consumption at the property 102 exceeds the expected rate of water consumption at the property based on the current rate of water consumption exceeding the expected rate of water consumption by a threshold amount. For example, the threshold amount can be an excess of one liter per hour, two liters per hour, 100% of the expected water consumption, or 50% of the expected water consumption.

The smart water valve 126 can detect water usage at the property 102. The smart water valve 126 can measure water usage of water consumption devices, detect water leaks found in the monitored property 102, control the flow of water into the monitored property 102, and transmit information related to the water usage. The smart water valve 126 can detect characteristics of the water flowing into the monitored property 102, such as a flow rate, a temperature, and a likelihood of leaking. The system can include a temperature sensor configured to measure temperature of water flowing through a pipe.

The smart water valve 126 can allow water to flow from a pipe, or main, into a monitored property 102. Once the water flows into the pipes of the monitored property 102, the smart water valve 126 can detect changes in water flow rates. These changes in water flow rates can indicate water consumption devices are consuming water. For example, a change in water flow rate may indicate water is flowing from a faucet, a toilet flush, or from a showerhead. Alternatively, a change in water flow rate can indicate a leakage of water somewhere in the monitored property 102. For example, a leakage of water can include a bursting pipe leaking water, a pinhole leak in a pipe leaking water, a closed faucet running water for an extended period of time, or a dishwasher that is not running but is leaking water. The sensors found in the smart water valve 126 can detect these issues.

The process 400 includes, after determining that the water leak is occurring at the property, determining that a water usage profile of a particular water consuming device matches characteristics of the water leak (404). The smart water valve 126 can store device water usage profiles that can be used to predict which device is potentially leaking water. A device water usage profile describes how a particular device, such as the faucet 134c, consumes and/or uses water. Additionally, the device water usage profiles can store timestamped data of previous water consumption events corresponding to the particular device. The smart water valve 126 can store a device water usage profile for each device found in the monitored property 102.

The characteristics of the water leak can include a hot water flow rate of the water leak and a cold water flow rate of the water leak. For example, the hot water flow rate of the water leak may be one hundred ten liters per hour, and the cold water flow rate of the water leak may be one hundred forty liters per hour. The water usage profile of the particular water consuming device can include a hot water flow rate and a cold water flow rate. For example, the water usage profile of the faucet 134c can include a hot water flow rate of one hundred liters per hour and a cold water flow rate of one hundred fifty liters per hour.

Determining that the water usage profile of the particular water consuming device matches characteristics of the water leak can include determining that the hot water flow rate of the water leak matches the hot water flow rate of the particular water consuming device; and determining that the cold water flow rate of the water leak matches the cold water flow rate of the particular water consuming device. For example, the smart water valve 126 can determine that the hot water flow rate of the water leak, one hundred ten liters per hour, matches the hot water flow rate of the faucet, one hundred liters per hour. The smart water valve 126 can determine that the cold water flow rate of the water leak, one hundred forty liters per hour, matches the cold water flow rate of the faucet 134c, one hundred fifty liters per hour.

In some examples, the smart water valve 126 can determine that the hot and cold flow rates of the water leak match the hot and cold flow rates of the particular water consuming device based on the flow rates matching within a threshold variance. For example, the threshold variance can be plus or minus twenty liters per hour, plus or minus fifteen liters per hour, plus or minus 10% of the flow rate of the water consuming device, or plus or minus 15% of the flow rate of the water consuming device.

The smart water valve 126 can compare the characteristics of the water usage data to data found in each of the water usage profiles. The smart water valve 126 can determine which particular device corresponds to the water usage data based on the comparison. The smart water valve 126 can compare the water flow rates from each of the device water usage profile to flow rates found in the water usage data. For example, the smart water valve 126 can compare the water flow rates from the faucet 134c to the flow rate of the water leak.

The smart water valve 126 can compare the temperature of the water found in the water usage data to the temperature data described in each of the device water usage profiles. The characteristics of the water leak can include a temperature of the water leak. For example, the temperature of the water leak may be 60 degrees F. The water usage profile of the particular water consuming device can include a temperature of water consumed by the particular water consuming device. For example, the water usage profile of a toilet may be 62 degrees F. Determining that the water usage profile of the particular water consuming device matches characteristics of the water leak can include determining that the temperature of the water leak matches the temperature of water consumed by the particular water consuming device. For example, the smart water valve 126 can determine that the temperature of the water leak of 60 degrees F. matches the temperature of water consumed by the toilet of 62 degrees F.

In some examples, the smart water valve 126 can determine that temperature of the water leak matches the temperature of the particular water consuming device based on the temperatures matching within a threshold variance. For example, the threshold variance can be plus or minus 5 degrees, F., plus or minus 10 degrees F., or plus or minus 20 degrees F.

The water usage profile of the water consuming device can include a flow rate of the water consuming device when leaking. For example, the flow rate of the showerhead 136 when leaking may be 1.0 liter per hour. Determining that the water usage profile of the particular water consuming device matches characteristics of the water leak can include determining that the flow rate of the water leak matches the flow rate of the water consuming device when leaking. For example, the smart water valve 126 can determine that a flow rate of the water leak of 1.1 liters per hour matches the flow rate of the showerhead 136 of 1.0 liter per hour.

In some examples, the smart water valve 126 can determine that flow rate of the water leak matches the flow rate of the particular water consuming device when leaking based on the flow rates matching within a threshold variance. For example, the threshold variance can be plus or minus 0.5 liters per hour, plus or minus 1.0 liters per hour, plus or minus 25% of the flow rate, or plus or minus 40% of the flow rate.

Determining that a water usage profile of a particular water consuming device matches characteristics of the water leak can include determining a similarity between the characteristics of the water leak and each of a number of water usage profiles of water consuming devices at the property. For example, the smart water valve 126 may determine a similarity between the characteristics of the water leak and the water usage profiles of the toilet, the shower, and the faucet. For example, the smart water valve 126 may determine a similarity of 50% with the toilet, 30% with the shower, and 70% with the faucet.

Based on the comparison of the water usage data to the data found in the one or more water usage profiles, the smart water valve 126 can determine which device water usage profile most closely resembles the water usage data, and deem the corresponding device as the device that is likely leaking water. For example, the comparison may result in a statistical match, or similarity (e.g., 85% similarity)

Determining that a water usage profile of a particular water consuming device matches characteristics of the water leak can include identifying a particular water usage profile having a greater similarity to the characteristics of the water leak than any other water usage profile. For example, the smart water valve 126 can identify that the water usage profile of the faucet, having a similarity to the characteristics of the water leak of 70%, has a greater similarity to the characteristics of the water leak than the water usage profiles of the shower and the toilet. Based on identifying the particular water usage profile having the greater similarity to the characteristics of the water leak than any other water usage profile, the smart water valve 126 can determine that the water usage profile of the particular water consuming device matches characteristics of the water leak. For example, based on identifying that the water usage profile of the faucet has a greater similarity to the characteristics of the water leak than the water usage profiles of the shower and the toilet, the smart water valve 126 can determine that the water usage profile of the faucet matches characteristics of the water leak.

Determining that a water usage profile of a particular water consuming device matches characteristics of the water leak can include determining whether a database of water usage profiles includes one or more water usage profiles that match the characteristics of the water leak within a predetermined similarity threshold. For example, the smart water valve 126 can identify that the water usage profile of the washing machine has a similarity to the characteristics of the water leak of 80%. The predetermined similarity threshold may be 75%. Thus, the smart water valve 126 can determine that the water usage profile of the washing machine matches the characteristics of the water leak within the predetermined similarity threshold.

The process 400 includes, based on determining that the water usage profile of a particular water consuming device matches characteristics of the water leak, identifying a water consuming device that is likely leaking (406). Based on applying the water usage to the one or more water usage profiles, the smart water valve 126 determines a water consumption device that is likely leaking. For example, based on determining that the water usage profile of the washing machine matches characteristics of the water leak, the smart water valve 126 can identify that the washing machine is likely leaking.

The process 400 includes, in response to identifying the water consuming device that is likely leaking, performing a system action (408). The system action can include sending a notification to a user associated with the monitored property 102, e.g., the property owner 120. For example, in response to identifying that the washing machine is likely leaking, the smart water valve 126 can transmit a notification to the property owner 120 indicating that the washing machine is likely leaking. The notification can indicate to the property owner that the washing machine is potentially leaking water. For example, the notification can recite "washing machine is potentially leaking water." The property owner 120 can respond to the notification, indicating that a technician should be dispatched or that the washing machine 140 is not likely leaking water, for example.

The system action can also include throttling a water flow through a pipe. Throttling the water flow through the pipe can include sending, to an electronic actuator of a valve disc, a signal to adjust the valve disc to throttle the water flow through the pipe. For example, the smart water valve can send a signal to the electronic actuator of the ball valve 208 to adjust the ball valve 208 to throttle down, reducing the flow of water through the cold water input 124. Throttling the water flow through the pipe can include throttling the water flow through the pipe to achieve a flow rate of zero liters per hour through the pipe. For example, the smart valve can send a signal to the electronic actuator of the ball valve 208 to adjust the ball valve 208 to throttle shut, stopping the flow of water through the cold water input 124.

Figure 5:
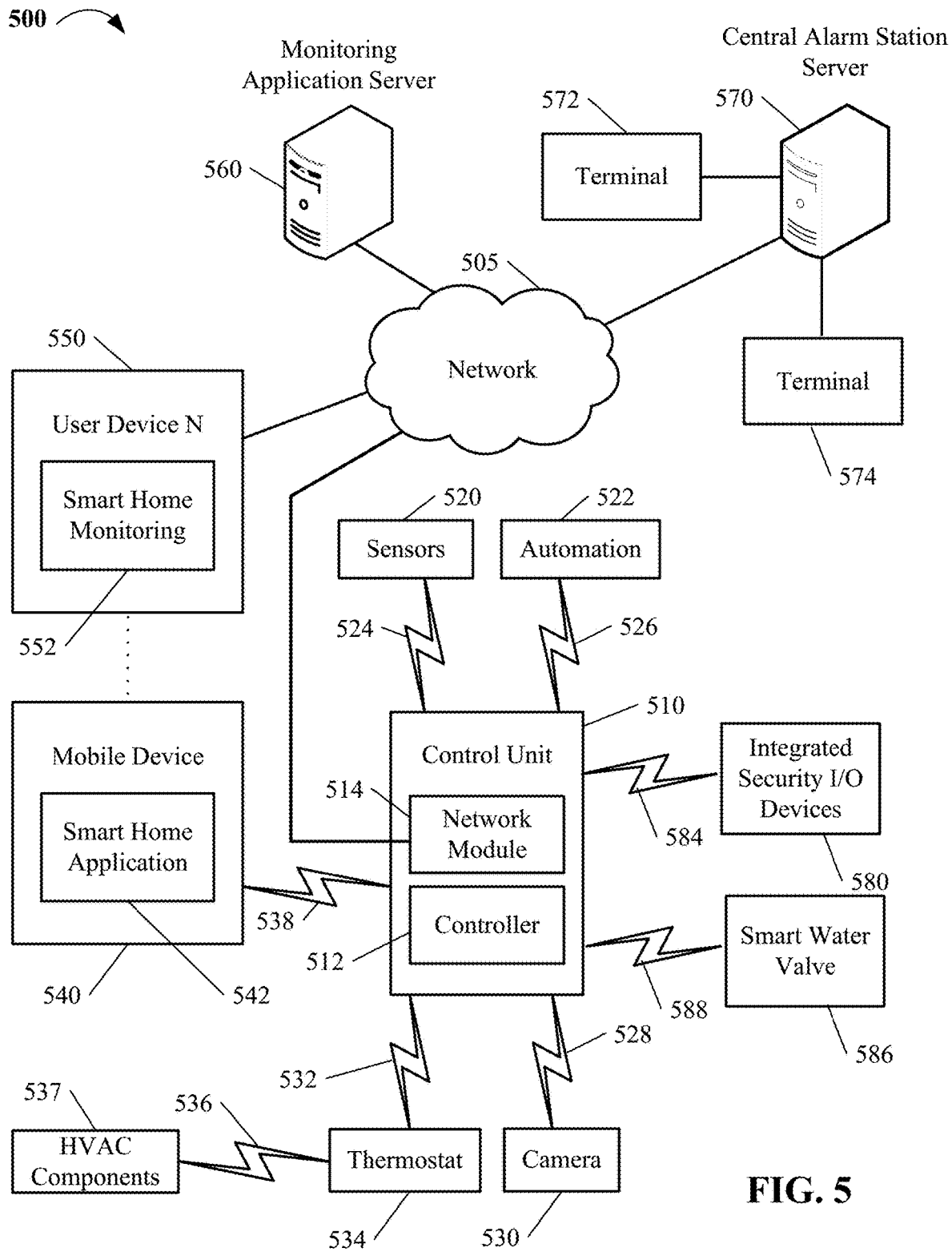
FIG. 5 is a block diagram of an example of a home monitoring system that may utilize various components to monitor water consumption devices.

FIG. 5 is a block diagram of an example of a home monitoring system 500 that may utilize various components to monitor water consumption devices. The home monitoring system 500 includes a network 505, a control unit server 510, one or more user devices 540 and 550, a monitoring application server 560, and a central alarm station server 570. In some examples, the network 505 facilitates communications between the control unit server 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit server 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit server 510 includes a controller 512 and a network module 514. The controller 512 is configured to control an HVAC system that includes the control unit server 510. In some examples, the controller 512 may include a processor or other control circuitry configured to execute instructions of a program that controls operation of an HVAC system. In these examples, the controller 512 may be configured to receive input from sensors, thermostats, or other devices included in the HVAC system and control operations of devices included in the monitored property (e.g., a showerhead, a faucet, a dishwasher, etc.). For example, the controller 512 may be configured to control operation of the network module 514 included in the control unit server 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit server 510 to communicate over a local area network and/or the Internet. The network module 514 also may be a voiceband modem configured to enable the alarm panel to communicate over the telephone lines of Plain Old Telephone Systems (POTS).

The HVAC system that includes the control unit server 510 includes one or more sensors. For example, the monitoring system may include multiple sensors 520. The sensors 520 may include a temperature sensor, a humidity sensor, a leaking sensor, or any other type of sensor included in an HVAC system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit server 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol). Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the control unit server 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a HVAC system monitored by the control unit server 510. The camera 530 may be configured to capture single, static images of the area and also video images of the area in which multiple images of the area are captured at a relatively high frequency (e.g., thirty images per second). The camera 530 may be controlled based on commands received from the control unit server 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit server 510. The camera 530 may employ a small solar cell to recharge the battery when sunlight is available. Alternatively, the camera 530 may be powered by the controller 512's power supply if the camera 530 is co-located with the controller 512.

In some implementations, the camera 530 communicates directly with the monitoring application server 560 over the Internet. In these implementations, image data captured by the camera 530 does not pass through the control unit server 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit server 510 and can control the environmental (e.g., temperature) settings based on commands received from the control unit server 510.

In some implementations, the thermostat 534 is a dynamically programmable thermostat and can be integrated with the control unit server 510. For example, the dynamically programmable thermostat 534 can include the control unit server 510, e.g., as an internal component to the dynamically programmable thermostat 534. In addition, the control unit server 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580. The system 500 additionally includes a smart water valve 586. The smart water valve 586 can include a device with multiple sensors that provide alerts to the control unit 510 based on the sensor data. The one or more control units 510 may additionally provide alerts or instructions to the smart water valve 586. Additionally, the smart water valve 586 may receive one or more sensor data from the sensors 520 and sensors within its housing to provide alerts to the control unit 510 and the monitoring application server 560. The smart water valve 586 can monitor water usage and water consumption devices found in the monitored property.

The sensors 520, the module 522, the camera 530, the thermostat 534, the integrated security devices 580, and the smart water valve 586 communicate with the controller 512 over communication links 524, 526, 528, 532, 584, and 588. The communication links 524, 526, 528, 532, 584, and 588 may be a wired or wireless data pathway configured to transmit signals from the sensors 520, the module 522, the camera 530, the thermostat 534, the integrated security devices 580, and the smart water valve 586 to the controller 512. The sensors 520, the module 522, the camera 530, the thermostat 534, the integrated security devices 580, and the smart water valve 586 may continuously transmit sensed values to the controller 512, periodically transmit sensed values to the controller 512, or transmit sensed values to the controller 512 in response to a change in a sensed value.

The communication links 524, 526, 528, 532, 584, and 588 may include a local network. The sensors 520, the module 522, the camera 530, the thermostat 534, the integrated security devices 580, the smart water valve 586, and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring application server 560 is an electronic device configured to provide monitoring services by exchanging electronic communications with the control unit server 510, the one or more user devices 540 and 550, and the central alarm station server 570 over the network 505. For example, the monitoring application server 560 may be configured to monitor events (e.g., alarm events) generated by the control unit server 510. In this example, the monitoring application server 560 may exchange electronic communications with the network module 514 included in the control unit server 510 to receive information regarding events (e.g., HVAC control events) detected by the control unit server 510. The monitoring application server 560 also may receive information regarding events (e.g., HVAC events) from the one or more user devices 540 and 550.

In some examples, the monitoring application server 560 may route HVAC data received from the network module 514 or the one or more user devices 540 and 550 to the central alarm station server 570. For example, the monitoring application server 560 may transmit the HVAC data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit server 510 or the one or more user devices 540 and 550.

The central alarm station server 570 is an electronic device configured to provide alarm monitoring service by exchanging communications with the control unit server 510, the one or more mobile devices 540 and 550, and the monitoring application server 560 over the network 505. For example, the central alarm station server 570 may be configured to monitor HVAC events generated by the control unit server 510. In this example, the central alarm station server 570 may exchange communications with the network module 514 included in the control unit server 510 to receive information regarding HVAC events detected by the control unit server 510. The central alarm station server 570 also may receive information regarding HVAC events from the one or more mobile devices 540 and 550 and/or the monitoring application server 560.

The central alarm station server 570 is connected to multiple terminals 572 and 574. The terminals 572 and 574 may be used by operators to process HVAC events. For example, the central alarm station server 570 may route HVAC data to the terminals 572 and 574 to enable an operator to process the HVAC data. The terminals 572 and 574 may include general-purpose computers (e.g., desktop personal computers, workstations, or laptop computers) that are configured to receive HVAC data from a server in the central alarm station server 570 and render a display of information based on the HVAC data. For instance, the controller 512 may control the network module 514 to transmit, to the central alarm station server 570, HVAC data indicating that a sensor 520 detected a flow rate of air in the air handling unit 154. The central alarm station server 570 may receive the HVAC data and route the HVAC data to the terminal 572 for processing by an operator associated with the terminal 572. The terminal 572 may render a display to the operator that includes information associated with the HVAC event (e.g., the flow rate, the air duct the flow rate came from, the temperature of the air in the air duct, etc.) and the operator may handle the HVAC event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit server 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit server 510 using the communication link 538. For instance, the one or more user devices 540 and 550 may communicate with the control unit server 510 using various local wireless protocols such as Wi-Fi, Bluetooth, Zwave, Zigbee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit server 510, the one or more user devices 540 and 550 may communicate directly with the sensors and other devices controlled by the control unit server 510. In some implementations, the one or more user devices 540 and 550 replace the control unit server 510 and perform the functions of the control unit server 510 for local monitoring and long range/offsite communication.

In other implementations, the one or more user devices 540 and 550 receive monitoring system data captured by the control unit server 510 through the network 505. The one or more user devices 540, 550 may receive the data from the control unit server 510 through the network 505 or the monitoring application server 560 may relay data received from the control unit server 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit server 510 directly (e.g., through link 538) or through the monitoring application server 560 (e.g., through network 505) based on a location of the one or more user devices 540 and 550. For instance, when the one or more user devices 540 and 550 are located close to the control unit server 510 and in range to communicate directly with the control unit server 510, the one or more user devices 540 and 550 use direct communication. When the one or more user devices 540 and 550 are located far from the control unit server 510 and not in range to communicate directly with the control unit server 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, and the camera 530. The one or more user devices 540 and 550 receive data directly from the sensors 520, the module 522, and the camera 530 and sends data directly to the sensors 520, the module 522, and the camera 530. The one or more user devices 540, 550 provide the appropriate interfaces/processing to provide visual surveillance and reporting.

In other implementations, the system 500 further includes network 505 and the sensors 520, the module 522, the camera 530, and the thermostat 534 are configured to communicate sensor and image data to the one or more user devices 540 and 550 over network 505 (e.g., the Internet, cellular network, etc.). In yet another implementation, the sensors 520, the module 522, the camera 530, and the thermostat 534 (or a component, such as a bridge/router) are intelligent enough to change the communication pathway from a direct local pathway when the one or more user devices 540 and 550 are in close physical proximity to the sensors 520, the module 522, the camera 530, and the thermostat 534 to a pathway over network 505 when the one or more user devices 540 and 550 are farther from the sensors 520, the module 522, the camera 530, and the thermostat 534. In some examples, the system leverages GPS information from the one or more user devices 540 and 550 to determine whether the one or more user devices 540 and 550 are close enough to the sensors 520, the module 522, the camera 530, and the thermostat 534 to use the direct local pathway or whether the one or more user devices 540 and 550 are far enough from the sensors 520, the module 522, the camera 530, and the thermostat 534 that the pathway over network 505 is required. In other examples, the system leverages status communications (e.g., pinging) between the one or more user devices 540 and 550 and the sensors 520, the module 522, the camera 530, and the thermostat 534 to determine whether communication using the direct local pathway is possible. If communication using the direct local pathway is possible, the one or more user devices 540 and 550 communicate with the sensors 520, the module 522, the camera 530, and the thermostat 534 using the direct local pathway. If communication using the direct local pathway is not possible, the one or more user devices 540 and 550 communicate with the sensors 520, the module 522, the camera 530, and the thermostat 534 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
a valve configured to control water flow through a pipe, wherein water flows through the pipe from an upstream direction towards a downstream direction;
a first flow sensor positioned downstream relative to the valve and configured to measure water flow through the pipe within a first range of flow rates;
a second flow sensor positioned downstream relative to the first flow sensor, wherein:
the second flow sensor is positioned in a bypass connecting to the pipe at each of a first connection upstream of the second flow sensor and a second connection downstream of the second flow sensor; and
the second flow sensor is configured to measure water flow through the pipe within a second range of flow rates including flow rates that are lower than the first range of flow rates;
one or more processors and one or more computer storage media storing instructions that are operable, when executed by the one or more processors, to cause the one or more processors to perform operations comprising:
determining, using flow sensor data generated by at least one of the first flow sensor or the second flow sensor, that a water leak is occurring at a property; and
in response to determining that the water leak is occurring at the property, performing a system action.

2. The system of claim 1, wherein determining that the water leak is occurring at the property comprises determining, using flow sensor data generated by the second flow sensor, that a water flow rate through a pipe is greater than zero liters per hour and not greater than six liters per hour.

3. The system of claim 1, comprising:
a first check valve positioned in the pipe at a location between the first connection and the second connection; and
a second check valve positioned in the pipe at a location downstream from the second connection,
wherein the first check valve and the second check valve are configured to (i) prevent water from flowing through the pipe in an upstream direction and (ii) reduce pressure fluctuations in the bypass.

4. The system of claim 1, the operations comprising:
determining that a water usage profile of a particular water consuming device matches characteristics of the water leak;
in response to determining that the water usage profile of a particular water consuming device matches characteristics of the water leak, identifying a water consuming device that is likely leaking, wherein:
the characteristics of the water leak comprise a hot water flow rate of the water leak and a cold water flow rate of the water leak;
the water usage profile of the particular water consuming device comprises a hot water flow rate and a cold water flow rate; and
determining that the water usage profile of the particular water consuming device matches characteristics of the water leak comprises:
determining that the hot water flow rate of the water leak matches the hot water flow rate of the particular water consuming device; and
determining that the cold water flow rate of the water leak matches the cold water flow rate of the particular water consuming device.

5. The system of claim 1, the operations comprising:
determining that a water usage profile of a particular water consuming device matches characteristics of the water leak;
in response to determining that the water usage profile of a particular water consuming device matches characteristics of the water leak, identifying a water consuming device that is likely leaking, wherein:
the characteristics of the water leak comprise a temperature of the water leak;
the water usage profile of the particular water consuming device comprises a temperature of water consumed by the particular water consuming device; and
determining that the water usage profile of the particular water consuming device matches characteristics of the water leak comprises:
determining that the temperature of the water leak matches the temperature of water consumed by the particular water consuming device.

6. The system of claim 1, wherein determining that a water leak is occurring at the property comprises:
determining an expected rate of water consumption at the property;
determining, using the flow sensor data generated by the at least one of the first flow sensor or the second flow sensor, a current rate of water consumption at the property; and
determining that the current rate of water consumption at the property exceeds the expected rate of water consumption at the property.

7. The system of claim 6, wherein determining the expected rate of water consumption at the property comprises:
receiving, from one or more sensors, sensor data that indicates an operating condition of each water consuming device at the property; and
determining, using the sensor data, the expected rate of water consumption at the property.

8. The system of claim 6, wherein determining the expected rate of water consumption at the property comprises:
receiving, from one or more sensors, occupancy data that indicates an occupancy of the property; and
determining, using the occupancy data, the expected rate of water consumption at the property.

9. The system of claim 1, wherein the second flow sensor comprises an ultrasonic sensor configured to detect a water leak by measuring a frequency of acoustic waves reflected by water flowing through the pipe.

10. The system of claim 1, comprising a temperature sensor positioned between the first flow sensor and the second flow sensor, wherein the temperature sensor is configured to measure temperature of water flowing through the pipe.

11. The system of claim 1, the system action comprises throttling the water flow through the pipe including:
sending, to an electronic actuator of the valve, a signal to adjust a position of the valve to throttle the water flow through the pipe.

12. The system of claim 1, wherein determining that the water leak is occurring at the property comprises determining that a water flow rate through a pipe is greater than zero liters per hour and not greater than six liters per hour for a time duration greater than a threshold time duration.

13. A method, comprising:
determining, using flow sensor data generated by at least one of a first flow sensor or a second flow sensor, that a water leak is occurring at a property, wherein:
the first flow sensor is i) positioned downstream relative to a valve configured to control water flow through a pipe, and ii) configured to measure water flow through the pipe within a first range of flow rates, and
the second flow sensor is i) positioned downstream relative to the first flow sensor in a bypass connecting to the pipe at each of a first connection upstream of the second flow sensor and a second connection downstream of the second flow sensor, and ii) configured to measure water flow through the pipe within a second range of flow rates including flow rates that are lower than the first range of flow rates; and in response to determining that the water leak is occurring at the property, performing a system action.

14. A non-transitory computer-readable medium storing software comprising instructions executable by one or more computers which, upon such execution, cause the one or more computers to perform operations comprising:
determining, using flow sensor data generated by at least one of a first flow sensor or a second flow sensor, that a water leak is occurring at a property, wherein:
the first flow sensor is i) positioned downstream relative to a valve configured to control water flow through a pipe, and ii) configured to measure water flow through the pipe within a first range of flow rates, and
the second flow sensor is i) positioned downstream relative to the first flow sensor in a bypass connecting to the pipe at each of a first connection upstream of the second flow sensor and a second connection downstream of the second flow sensor, and ii) configured to measure water flow through the pipe within a second range of flow rates including flow rates that are lower than the first range of flow rates; and
in response to determining that the water leak is occurring at the property, performing a system action.

15. The system of claim 1, wherein the second flow sensor comprises a thermal sensor configured to detect a water leak by measuring a temperature differential between a heated element and a non-heated element.

16. The system of claim 1, wherein the second flow sensor comprises a vortex shedding sensor configured to detect a water leak by measuring a frequency of oscillating vortices in water flowing through the pipe.

17. The system of claim 1, wherein determining that a water leak is occurring at a property comprises:
receiving, from the second flow sensor, a digital signal indicating water flow detected by the second flow sensor;
removing noise from the digital signal, including applying a digital filter to the digital signal; and
determining, using the filtered digital signal, that the water leak is occurring at the property.

18. The system of claim 1, the operations comprising:
classifying, using flow sensor data generated by the first flow sensor, the water leak as a high flow water leak; and
in response to classifying the water leak as a high flow water leak, determining to perform a system action including shutting the valve.

19. The system of claim 1, the operations comprising:
classifying, using flow sensor data generated by the second flow sensor, the water leak as a low flow water leak; and
in response to classifying the water leak as a low flow water leak, determining to perform a system action including sending a notification to a resident of the property indicating that the water leak is occurring at the property.

20. The system of claim 1, wherein determining that the water leak is occurring at the property comprises determining, using flow sensor data generated by the first flow sensor, that a water flow rate through a pipe is one hundred eighty liters per hour or greater and thirty six hundred liters per hour or less.

* * * * *